(12) United States Patent  
Zhang et al.

(10) Patent No.: US 11,265,941 B2
(45) Date of Patent: Mar. 1, 2022

(54) METHOD AND DEVICE FOR WIRELESS COMMUNICATION NODE

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/023,372

(22) Filed: Sep. 17, 2020

(65) Prior Publication Data
US 2021/0007165 A1 Jan. 7, 2021

Related U.S. Application Data

(63) Continuation of application No. PCT/CN2018/086301, filed on May 10, 2018.

(51) Int. Cl.
H04W 4/00 (2018.01)
H04W 76/14 (2018.01)
H04W 76/15 (2018.01)
H04W 8/00 (2009.01)
H04W 48/16 (2009.01)
(Continued)

(52) U.S. Cl.
CPC ........... *H04W 76/14* (2018.02); *H04W 8/005* (2013.01); *H04W 48/16* (2013.01); *H04W 56/001* (2013.01); *H04W 72/046* (2013.01); *H04W 76/15* (2018.02)

(58) Field of Classification Search
USPC .......................................... 370/329
See application file for complete search history.

(56) References Cited

U.S. PATENT DOCUMENTS 10,548,106 B2 * 1/2020 Chae ................. H04W 56/0015
10,637,544 B1 * 4/2020 Shattil .................... H04B 7/026
11,153,837 B2 * 10/2021 Abedini ................. H04B 7/185
(Continued)

FOREIGN PATENT DOCUMENTS

CN 106162597 A 11/2016
CN 107439050 A 12/2017
WO 2017007285 A1 1/2017

OTHER PUBLICATIONS

ISR in application PCT/CN2018/086301 dated Dec. 26, 2018.
(Continued)

*Primary Examiner* — Marceau Milord

(57) ABSTRACT

The present disclosure discloses a method and a device in a node for wireless communications. A first node judges whether the first node is in coverage; and then transmits Q second-type radio signals; herein, the Q second-type radio signals respectively comprise Q pieces of first-type information; whether each of the Q second-type radio signals can be selected as a synchronization reference is related to its comprised first-type information; the Q pieces of first-type information are independently generated, or, whether the Q pieces of first-type information are independently generated is related to whether the first node is in coverage, Q being a positive integer greater than 1. The present disclosure improves transmission reliability of Sidelink.

20 Claims, 15 Drawing Sheets

(51) Int. Cl.
*H04W 56/00* (2009.01)
*H04W 72/04* (2009.01)

(56) References Cited

U.S. PATENT DOCUMENTS

| | | | | |
|---|---|---|---|---|
| 2018/0206208 A1* | 7/2018 | Nguyen | | H04W 72/0446 |
| 2018/0242317 A1* | 8/2018 | Marinier | | H04W 72/0446 |
| 2018/0331860 A1* | 11/2018 | Bergman | | H04L 5/0048 |
| 2019/0132832 A1* | 5/2019 | Uchiyama | | H04W 4/40 |
| 2019/0132847 A1* | 5/2019 | Abedini | | H04W 52/28 |
| 2019/0253112 A1* | 8/2019 | Raghavan | | H04B 7/0456 |
| 2019/0306850 A1* | 10/2019 | Zhang | | H04L 5/0044 |
| 2019/0319686 A1* | 10/2019 | Chen, IV | | H04B 7/088 |
| 2019/0363843 A1* | 11/2019 | Gordaychik | | H04L 1/1854 |
| 2019/0364492 A1* | 11/2019 | Azizi | | H04W 48/16 |
| 2020/0008183 A1* | 1/2020 | Chen | | H04W 72/0406 |
| 2020/0036422 A1* | 1/2020 | Li | | H04W 72/046 |
| 2020/0304253 A1* | 9/2020 | Choi | | H04L 5/0053 |
| 2020/0351126 A1* | 11/2020 | Siomina | | H04W 76/28 |
| 2020/0359245 A1* | 11/2020 | Da Silva | | H04L 5/0051 |
| 2020/0389216 A1* | 12/2020 | He | | H04B 7/0626 |
| 2021/0076236 A1* | 3/2021 | Kimura | | H04W 4/40 |
| 2021/0153203 A1* | 5/2021 | Parkvall | | H04L 5/0048 |
| 2021/0167996 A1* | 6/2021 | Ratnam | | H04L 27/2649 |
| 2021/0176720 A1* | 6/2021 | Chae | | H04W 92/18 |

OTHER PUBLICATIONS

FUJITSU."R1-153060,Discussion on discovery in partiallout of network coverage,"3GPP TSGRAN WG1 Meeting #81,May 29, 2015(May 29, 2015), section 2.

CATT."R1-166432, Synchronization enhancements in PC5-based V2V,"3GPP TSG RAN WG/Meeting#86,Aug. 26, 2016(Aug. 26, 2016).

* cited by examiner

METHOD AND DEVICE FOR WIRELESS COMMUNICATION NODE

CROSS REFERENCE TO RELATED APPLICATIONS

This application is a continuation of International Application No. PCT/CN2018/086301, filed May 10, 2018, the full disclosure of which is incorporated herein by reference.

BACKGROUND

Technical Field

The present disclosure relates to transmission methods and devices in wireless communication systems, and in particular to a multi-antenna related transmission scheme and device in wireless communications.

Background

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving.

SUMMARY

To meet emerging traffic requirements, an NR V2X system is an updated version of the LTE V2X system, featuring higher throughput and reliability, lower latency, more distant communications with more precise positioning, and larger packet size and more various transmission period, as well as key technical features more compatible with the current 3GPP and non-3GPP techniques. Further, the NR V2X will be applied in a higher-frequency section. There is now a hot debate among members of 3GPP about 6 GHz-and-above sidelink channel model Synchronization is a prerequisite for Sidelink transmissions. In order to maintain synchronization between User Equipments (UEs), the system will instruct the UEs to transmit Sidelink Synchronization Signals (SLSSs) and some necessary system information on Sidelinks. Time and frequency of Sidelink transmissions or receptions obtained by the UEs through these SLSSs are synchronized. When a UE receives SLSSs from multiple UEs, the UE needs to distinguish priorities of these UEs, so as to select one SLSS as its synchronization reference.

Since the existing LTE D2D/V2X is mainly applied in low frequency-band, a SLSS mainly adopts a single-wave-quasi-omnidirectional transmission scheme. While a high frequency scenario is featured with transmission characteristics of severe signal attenuation, short transmission distance, extremely wide bandwidth and narrow beam, so it is expected that an SLSS in NR system will adopt multi-beam transmission. Therefore, a UE may receive SLSSs of different beams from multiple UEs. How to select one SLSS out of SLSSs of multiple beams by the UE as its synchronization reference is a problem to be solved.

In view of the above problem, the present disclosure provides a solution. It should be noted that the embodiments of a User Equipment (UE) in the present disclosure and the characteristics of the embodiments may be applied to a base station if no conflict is incurred, and vice versa. The embodiments of the present disclosure and the characteristics of the embodiments may be mutually combined if no conflict is incurred. Furthermore, though originally targeted at multi-antenna-based communications, the present disclosure is also applicable to single-antenna communications. Besides, the present disclosure not only applies to high-frequency communications, but also to lower-frequency communications.

The present disclosure provides a method in a first node for wireless communications, comprising:
 judging whether the first node is in coverage; and
 transmitting Q second-type radio signals;
 herein, the Q second-type radio signals respectively comprise Q pieces of first-type information; whether each of the Q second-type radio signals can be selected as a synchronization reference is related to its comprised first-type information; the Q pieces of first-type information are independently generated, Q being a positive integer greater than 1.

The present disclosure provides a method in a first node for wireless communications, comprising:
 judging whether the first node is in coverage; and
 transmitting Q second-type radio signals;
 herein, the Q second-type radio signals respectively comprise Q pieces of first-type information; whether each of the Q second-type radio signals can be selected as a synchronization reference is related to its comprised first-type information; whether the Q pieces of first-type information are independently generated is related to whether the first node is in coverage, Q being a positive integer greater than 1.

In one embodiment, a problem needed to be solved in the present disclosure is: in a high-frequency or multi-antenna scenario, when a first node transmits multiple synchronization broadcast signals with a multi-beam method, how a second node selects a synchronization broadcast signal of each beam as a synchronization reference. The above method solves the problem in that the Q pieces of independently-generated first-type information respectively carry beam-related information, and the Q pieces of first-type information are used respectively for determining a priority of a synchronization broadcast signal of each beam selected as a synchronization reference, thus ensuring reliability of synchronization of a second node.

In one embodiment, the above method is characterized in that a connection is created between beam-related information and a synchronization reference priority.

In one embodiment, the above method is characterized in that a connection is created between the first-type information and whether the second-type radio signal is selected as a synchronization reference.

In one embodiment, the above method is characterized in that when there is a beam correspondence relation between a transmitting beam of a synchronization broadcast signal and a receiving beam of a synchronization-resource signal, a priority of the one synchronization broadcast signal being selected as a synchronization reference is higher.

In one embodiment, the above method is advantageous in that when there is a beam correspondence relation between a synchronization broadcast signal and a synchronization-source signal, a transmission timing of the one synchronization broadcast signal and a reception timing of the synchronization-source signal match better, so transmission reliability of the one synchronization broadcast signal being selected as a synchronization reference is higher.

In one embodiment, the above method is characterized in that a connection is created between a generation method of the first-type information and a position where the first node located.

In one embodiment, the above method is characterized in that whether the first-type information is multi-beam common information or beam-specific information is determined by a position where the first node located.

In one embodiment, the above method is characterized in that the first node is in coverage, and the first-type information is beam-specific information. In one embodiment, the above method is characterized in that the first node is out of coverage, and the first-type information is multi-beam common information.

In one embodiment, the above method is advantageous in that when the first node is in coverage, a generation of the second radio signal can take characteristics of multi-beam into account.

In one embodiment, the above method is advantageous in that when the first node is out of coverage, a generation of the second radio signal does not need to take characteristics of multi-beam into account.

According to one aspect of the present disclosure, the above method is characterized in comprising:

receiving P first-type radio signal(s), P being a positive integer;

herein, each of the Q pieces of first-type information is related to Spatial Rx parameter(s) of one of the P first-type radio signal(s).

According to one aspect of the present disclosure, the above method is characterized in comprising:

each of the Q second-type radio signals comprises a second information, the second information being used for indicating whether the first node is in coverage.

According to one aspect of the present disclosure, the above method is characterized in comprising:

receiving a target-specific signal, and judging whether the first node is in coverage according to target received quality of the target-specific signal.

According to one aspect of the present disclosure, the above method is characterized in comprising:

when the first node is in coverage, the Q pieces of first-type information are independently generated; and when the first node is out of coverage, the Q pieces of first-type information are not independently generated.

According to one aspect of the present disclosure, the above method is characterized in that, the first node is a UE.

According to one aspect of the present disclosure, the above method is characterized in that, the first node is a relay node.

The present disclosure provides a method in a second node for wireless communications, comprising:

receiving Q0 second-type radio signal(s) of Q second-type radio signals;

herein, the Q second-type radio signals respectively comprise Q pieces of first-type information; whether each of the Q0 second-type radio signal(s) can be selected as a synchronization reference is related to its comprised first-type information; the Q pieces of first-type information are independently generated, Q being a positive integer greater than 1, Q0 being a positive integer no greater than the Q.

The present disclosure provides a method in a second node for wireless communications, comprising:

receiving Q0 second-type radio signal(s) of Q second-type radio signals;

herein, the Q second-type radio signals respectively comprise Q pieces of first-type information; whether each of the Q0 second-type radio signal(s) can be selected as a synchronization reference is related to its comprised first-type information; whether the Q pieces of first-type information are independently generated is related to whether the transmitter of the Q second-type radio signals is in coverage, Q being a positive integer greater than 1, Q0 being a positive integer no greater than the Q.

According to one aspect of the present disclosure, the above method is characterized in that each of the Q0 piece(s) of first-type information is related to Spatial Rx parameter(s) of one of P first-type radio signal(s), the P first-type radio signal(s) is(are) received by the transmitter of the Q second-type radio signals; and P is a positive integer.

According to one aspect of the present disclosure, the above method is characterized in that each of the Q0 second-type radio signal(s) comprises a second information, the second information indicating whether the transmitter of the Q second-type radio signals is in coverage.

According to one aspect of the present disclosure, the above method is characterized in that received quality of a received specific signal is used by the transmitter of the Q second-type radio signals for judging whether the transmitter is in coverage.

According to one aspect of the present disclosure, the above method is characterized in that when the transmitter of the Q second-type radio signals is in coverage, the Q pieces of first-type information are independently generated; when the transmitter of the Q second-type radio signals is out of coverage, the Q pieces of first-type information are not independently generated.

According to one aspect of the present disclosure, the above method is characterized in that the second node is a UE.

According to one aspect of the present disclosure, the above method is characterized in that the second node is a relay node.

The present disclosure provides a first node for wireless communications, comprising:

a first processor: judging whether the first node is in coverage; and a first transmitter: transmitting Q second-type radio signals;

herein, the Q second-type radio signals respectively comprise Q pieces of first-type information; whether each of the Q second-type radio signals can be selected as a synchronization reference is related to its comprised first-type information; the Q pieces of first-type information are independently generated, Q being a positive integer greater than 1.

The present disclosure provides a first node for wireless communications, comprising:

a first processor: judging whether the first node is in coverage; and a first transmitter: transmitting Q second-type radio signals;

herein, the Q second-type radio signals respectively comprise Q pieces of first-type information; whether each of the Q second-type radio signals can be selected as a synchronization reference is related to its comprised first-type information; whether the Q pieces of first-type information are independently generated is related to whether the first node is in coverage, Q being a positive integer greater than 1.

According to one aspect of the present disclosure, the above first node is characterized in comprising:

a first receiver; receiving P first-type radio signal(s), P being a positive integer;

herein, each of the Q pieces of first-type information is related to Spatial Rx parameter(s) of one of the P first-type radio signal(s).

According to one aspect of the present disclosure, the above first node is characterized in that each of the Q second-type radio signals comprises a second information, the second information being used for indicating whether the first node is in coverage.

According to one aspect of the present disclosure, the above first node is characterized in comprising:

the first receiver receiving a target-specific signal, and judging whether the first node is in coverage according to target received quality of the target-specific signal.

According to one aspect of the present disclosure, the above first node is characterized in that when the first node is in coverage, the Q pieces of first-type information are independently generated; and when the first node is out of coverage, the Q pieces of first-type information are not independently generated.

According to one aspect of the present disclosure, the above first node is characterized in that the first node is a UE.

According to one aspect of the present disclosure, the above first node is characterized in that the first node is a relay node.

The present disclosure provides a second node for wireless communications, comprising:

a second receiver; receiving Q0 second-type radio signal(s) of Q second-type radio signals;

herein, the Q second-type radio signals respectively comprise Q pieces of first-type information; whether each of the Q0 second-type radio signal(s) can be selected as a synchronization reference is related to its comprised first-type information; the Q pieces of first-type information are independently generated, Q being a positive integer greater than 1, Q0 being a positive integer no greater than the Q.

The present disclosure provides a second node for wireless communications, comprising:

a second receiver; receiving Q0 second-type radio signal(s) of Q second-type radio signals;

herein, the Q second-type radio signals respectively comprise Q pieces of first-type information; whether each of the Q0 second-type radio signal(s) can be selected as a synchronization reference is related to its comprised first-type information; whether the Q pieces of first-type information are independently generated is related to whether the transmitter of the Q second-type radio signals is in coverage, Q being a positive integer greater than 1, Q0 being a positive integer no greater than the Q.

According to one aspect of the present disclosure, the above second node is characterized in that each of the Q0 piece(s) of first-type information is related to Spatial Rx parameter(s) of one of P first-type radio signal(s), the P first-type radio signal(s) is(are) received by the transmitter of the Q second-type radio signals; and P is a positive integer.

According to one aspect of the present disclosure, the above second node is characterized in that each of the Q0 second-type radio signal(s) comprises a second information, the second information indicating whether the transmitter of the Q second-type radio signals is in coverage.

According to one aspect of the present disclosure, the above second node is characterized in that received quality of a received target-specific signal is used by the transmitter of the Q second-type radio signals for judging whether the transmitter is in coverage.

According to one aspect of the present disclosure, the above second node is characterized in that when the transmitter of the Q second-type radio signals is in coverage, the Q pieces of first-type information are independently generated; when the transmitter of the Q second-type radio signals is out of coverage, the Q pieces of first-type information are not independently generated.

According to one aspect of the present disclosure, the above second node is characterized in that the second node is a UE.

According to one aspect of the present disclosure, the above second node is characterized in that the second node is a relay node.

In one embodiment, the present disclosure is advantageous in the following aspects:

A connection is created between beam-related information and a synchronization reference priority.

A connection is created between the first-type information and whether the second-type radio signal is selected as a synchronization reference.

Among multiple synchronization broadcast signals, the present disclosure configures a higher synchronization reference priority for a synchronization broadcast signal with a beam correspondence relation with a synchronization-source signal, thus improving transmission reliability of Sidelink.

A connection is created between a generation method of the first-type information and a position where the first node located.

A position of the first node is determined according to whether the first-type information is multi-beam common information or beam-specific information.

For the first node is in coverage, the first-type information is beam-specific information, and a generation of the second radio signal can take characteristics of multi-beam into account.

For the first node is out of coverage, the first-type information is multi-beam common information, and a generation of the second radio signal does not need to take characteristics of multi-beam into account.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
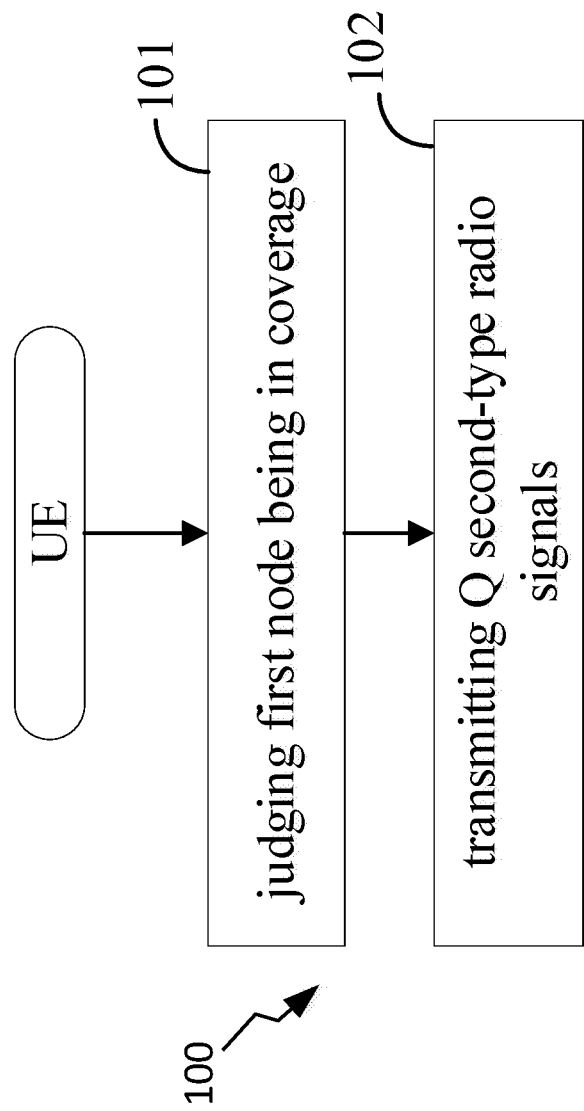
FIG. 1 illustrates a flowchart of transmitting Q second-type radio signals according to one embodiment of the present disclosure.

Embodiment 1 illustrates a flowchart of transmitting Q second-type radio signals, as shown in FIG. 1.

In Embodiment 1, a first node in the present disclosure judges whether the first node is in coverage; and transmits Q second-type radio signals; the Q second-type radio signals respectively comprise Q pieces of first-type information; whether each of the Q second-type radio signals can be selected as a synchronization reference is related to its comprised first-type information; the Q pieces of first-type information are independently generated, Q being a positive integer greater than 1.

In Embodiment 1, a first node in the present disclosure judges whether the first node is in coverage; and transmits Q second-type radio signals; the Q second-type radio signals respectively comprise Q pieces of first-type information; whether each of the Q second-type radio signals can be selected as a synchronization reference is related to its comprised first-type information; whether the Q pieces of first-type information are independently generated is related to whether the first node is in coverage, Q being a positive integer greater than 1.

In one embodiment, at least one of the Q second-type radio signals is used by a second node for determining a timing for receiving a signal, and receivers of the Q second-type radio signals comprise the second node.

In one embodiment, at least one of the Q second-type radio signals is used by a second node for determining a timing for transmitting a signal, and receivers of the Q second-type radio signals comprise the second node.

In one embodiment, one of the Q second-type radio signals comprises an SLSS.

In one embodiment, one of the Q second-type radio signals comprises a Primary Sidelink Synchronization Signal (PSSS).

In one embodiment, one of the Q second-type radio signals comprises a Secondary Sidelink Synchronization Signal (SSSS).

In one embodiment, one of the Q second-type radio signals comprises a Sidelink Broadcast Signal (SBS).

In one embodiment, one of the Q second-type radio signals comprises a Reference Signal (RS).

In one embodiment, one of the Q second-type radio signals comprises an SLSS/PSBCH block (SLSSB).

In one embodiment, one of the Q second-type radio signals comprises a Sidelink Discovery Reference Signal (SDRS).

In one embodiment, one of the Q second-type radio signals comprises a Preamble.

In one embodiment, one of the Q second-type radio signal is transmitted on a Sidelink Broadcast Channel (SL-BCH).

In one embodiment, one of the Q second-type radio signals is transmitted on a Physical Sidelink Broadcast Signal (PSBCH).

In one embodiment, one of the Q second-type radio signals is transmitted on a Physical Sidelink Control Channel (PSCCH).

In one embodiment, one of the Q second-type radio signals is transmitted on a Physical Sidelink Shared Channel (PSSCH).

In one embodiment, one of the Q second-type radio signals is transmitted on a Physical Sidelink Discovery Channel (PSDCH).

In one embodiment, one of the Q second-type radio signals comprises a PSBCH Demodulation Reference Signal (SBCH-DMRS).

In one embodiment, one of the Q second-type radio signals comprises a PSBCH Demodulation Reference Signal (PSBCH-DMRS), the PSBCH-DMRS is used for demodulating a PSBCH.

In one embodiment, a second target radio signal is one of the Q second-type radio signals.

In one embodiment, the second target radio signal comprises a second sequence.

In one embodiment, the second sequence is a pseudo-random sequence.

In one embodiment, the second sequence is a Gold sequence.

In one embodiment, the second sequence is an M sequence.

In one embodiment, the second sequence is a Zadeoff-Chu sequence.

In one embodiment, the second sequence comprises a first sub-sequence and a second sub-sequence.

In one embodiment, the first sub-sequence is a pseudo-random sequence.

In one embodiment, the first sub-sequence is a Gold sequence.

In one embodiment, the first sub-sequence is an M sequence.

In one embodiment, the first sub-sequence is a Zadeoff-Chu sequence.

In one embodiment, the second sub-sequence is a pseudo-random sequence.

In one embodiment, the second sub-sequence is a Gold sequence.

In one embodiment, the second sub-sequence is an M sequence.

In one embodiment, the second sub-sequence is a Zadeoff-Chu sequence.

In one embodiment, the second sequence is used for generating an SLSS.

In one embodiment, the first sub-sequence is used for generating a PSSS, and a second sub-sequence is used for generating an SSSS.

In one embodiment, the first sub-sequence is used for generating an SLSS, and a second sub-sequence is used for generating a PSBCH-DMRS.

In one embodiment, a second sequence is used for generating the second target radio signal.

In one embodiment, the second target radio signal is an output after the second sequence sequentially through Discrete Fourier Transform (DFT), Mapping to Physical Resources, Baseband Signal Generation, and Modulation and Upconversion.

In one embodiment, the second target radio signal is an output after the second sequence sequentially through Filter, and Modulation and Upconversion.

In one embodiment, the second target radio signal is an output after the second sequence sequentially through Precoding, Mapping to Physical Resources, Baseband Signal Generation, and Modulation and Upconversion.

In one embodiment, the second target radio signal is an output of the second sequence through at least one of modulation, DFT, precoding, Mapping to Physical Resources, Baseband Signal Generation, Filter, or Modulation and Upconversion.

In one embodiment, the second target radio signal comprises a Sidelink synchronization signal identity (SLSSID).

In one embodiment, an SLSSID of the second target radio signal is a non-negative integer.

In one embodiment, an SLSSID of the second target radio signal is no greater than 336.

In one embodiment, the second sequence is used for indicating an SLSSID of the second target radio signal.

In one embodiment, an SLSSID of the second target radio signal is used for generating the second sequence.

In one embodiment, an SLSSID of the second target radio signal is used for calculating a sequence generation initial value of the second sequence.

In one embodiment, an SLSSID of the second target radio signal is configured by a higher-layer signaling.

In one embodiment, an SLSSID of the second target radio signal is semi-statically configured.

In one embodiment, an SLSSID of the second target radio signal is configured by system information.

In one embodiment, an SLSSID of the second target radio signal is configured by a System Information Block (SIB).

In one embodiment, an SLSSID of the second target radio signal is configured by a Radio Resource Control (RRC) layer signaling.

In one embodiment, an SLSSID of the second target radio signal is configured by a Medium Access Control (MAC) layer signaling.

In one embodiment, an SLSSID of the second target radio signal is configured by a physical-layer signaling.

In one embodiment, an SLSSID of the second target radio signal is configured by Downlink Control Information (DCI).

In one embodiment, the second target radio signal comprises a Sidelink Broadcast Signal (SBS)

In one embodiment, the second target radio signal is transmitted on a Sidelink Broadcast Channel (SL-BCH).

In one embodiment, the second target radio signal is transmitted on a Physical Sidelink Broadcast Signal (PSBCH).

In one embodiment, the second target radio signal comprises a second bit block, the second bit block comprising a positive integer number of sequentially-arranged bits.

In one embodiment, the second bit block comprises one or more Fields in a Master Information Block (MIB).

In one embodiment, the second bit block comprises one or more fields in a Master Information Block-Sidelink (MIB-SL).

In one embodiment, the second bit block comprises all or part of bits of a Transport Block (TB).

In one embodiment, the second bit block comprises all or part of bits of a Code Block (CB).

In one embodiment, the second target radio signal is obtained by all or part of bits of the second bit block sequentially through first-level scrambling, TB-level Cyclic Redundancy Check (CRC) Attachment, Channel Coding, Rate Matching, second-level scrambling, Modulation, Layer Mapping, Transform Precoding, Precoding, Mapping to Physical Resources, Baseband Signal Generation, and Modulation and Upconversion.

In one embodiment, the second target radio is an output of all or part of bits through at least one of first-level scrambling, TB-level CRC attachment, Segmentation, CB-level CRC attachment, channel coding, rate matching, Concatenation, second-level scrambling, modulation, layer mapping, Spreading, Transform Precoding, precoding, Mapping to Physical Resources, Baseband Signal Generation or Modulation and Upconversion.

In one embodiment, the second bit block comprises one or more of SL-bandwidth, Sidelink TDD UL/DL configuration, Sidelink System Frame Number, and Sidelink subframe number.

In one embodiment, an SLSSID of the second target radio signal is used for generating a second-level scrambling sequence of the second target radio signal.

In one embodiment, the second target radio signal comprises the second sequence and the second bit block.

In one embodiment, the second target radio signal comprises the first sub-sequence, the second sub-sequence, and the second bit block.

In one embodiment, the second target radio signal comprises one or more of an SLSS, a PSSS, an SSSS, an SBS and a PSBCH-DMRS.

In one embodiment, the second target radio signal comprises an SLSS, an SBS, and a PSBCH-DMRS.

In one embodiment, the second target radio signal comprises a PSSS, an SSSS, an SBS, and a PSBCH-DMRS.

In one embodiment, the Synchronization Reference is used for determining timing information of Sidelink transmission.

In one embodiment, the synchronization reference is used for determining timing information of Sidelink communication.

In one embodiment, the synchronization reference is used for determining timing information of Sidelink discovery.

In one embodiment, the synchronization reference is used for determining timing information of Vehicle-to-Everything Sidelink communication.

In one embodiment, a receiver of the synchronization reference determines a transmission timing according to a reception timing of the synchronization reference.

In one embodiment, the transmission timing is a reception timing of the synchronization reference plus one offset.

In one embodiment, the one offset is fixed.

In one embodiment, the one offset is determined by a receiver of the synchronization reference itself.

In one embodiment, the one offset is configured.

In one embodiment, the one offset is a time offset.

In one embodiment, the one offset is measured by s.

In one embodiment, the one offset is measured by ms.

In one embodiment, the one offset is measured by us.

In one embodiment, the one offset is measured by sampling number.

In one embodiment, the transmission timing is used for transmitting a PSSCH.

In one embodiment, the transmission timing is used for transmitting a PSCCH.

In one embodiment, the transmission timing is used for transmitting a PSBCH.

In one embodiment, the transmission timing is used for transmitting a PSDCH.

In one embodiment, the transmission timing is used for transmitting a PUSCH.

In one embodiment, the transmission timing is used for transmitting a PUCCH.

In one embodiment, the transmission timing is used for transmitting an SRS.

In one embodiment, a receiver of the synchronization reference determines a reception timing according to a reception timing of the synchronization reference.

In one embodiment, a receiver of the synchronization reference determines a reception timing of a radio signal other than the synchronization reference according to a reception timing of the synchronization reference, and the transmitter of a radio signal other than the synchronization reference is the transmitter of the synchronization reference.

In one embodiment, a receiver of the synchronization reference determines a reception timing of the radio signal other than the synchronization reference according to a reception timing of the synchronization reference.

In one embodiment, first information is one of the Q pieces of first-type information.

In one embodiment, a second target radio signal is one of the Q second-type radio signals comprising the first information.

In one embodiment, first information comprised in at least two of the Q second-type radio signals is different.

In one embodiment, P is greater than 1, first information is any one of the Q pieces of first-type information, and a second radio signal is one of the Q second-type radio signals comprising the first information; when one of the Q first-type antenna port groups corresponding to the first information is associated with at least one of the P first-type radio signals, a level that the second radio signal is selected as a synchronization reference is a first synchronization level; otherwise a level that the second radio signal is selected as a synchronization reference is a second synchronization level; the first synchronization level has a higher priority over the second synchronization level.

In one embodiment, P is equal to 1, first information is any one of the Q pieces of first-type information, and a second radio signal is one of the Q second-type radio signals comprising the first information; when one of the Q first-type antenna port groups corresponding to the first information is associated with the P first-type radio signal, a level that the second radio signal is selected as a synchronization reference is a first synchronization level; otherwise a level that the second radio signal is selected as a synchronization reference is a second synchronization level; and the first synchronization level has a higher priority over the second synchronization level.

In one embodiment, a receiver of at least one of the Q second-type radio signals comprises a UE, and a transmitter of the P first-type radio signal(s) and the one UE are non-co-located.

In one embodiment, a transmitter of the P first-type radio signal(s) and the one UE being non-co-located comprises that a communication delay between the transmitter of the P first-type radio signal(s) and the one UE cannot be ignored.

In one embodiment, a transmitter of the P first-type radio signal(s) and the one UE being non-co-located comprises that there exists no wire link between the transmitter of the P first-type radio signal(s) and the one UE.

In one embodiment, a receiver of at least one of the Q second-type radio signals comprises a UE, and a transmitter of the P first-type radio signal(s) comprises a serving cell.

In one embodiment, a receiver of at least one of the Q second-type radio signals comprises a UE, P is greater than 1, and there exist at least two of the P first-type radio signals are respectively transmitted by two serving cells.

In one embodiment, a level of the synchronization reference comprises a first synchronization level and a second synchronization level, and the first synchronization level has a higher priority compared with the second synchronization level.

In one embodiment, a level of the synchronization reference comprises a first synchronization level and a second synchronization level, and the first synchronization level is more preferentially selected as the synchronization reference compared with the second synchronization level.

In one embodiment, whether each of the Q second-type radio signals can be selected as a synchronization reference being related to its comprised first-type information refers to that a priority of each of the Q second-type radio signals as a synchronization reference is determined by its comprised first-type information.

In one embodiment, when the first information indicates that the second target radio signal is associated with at least one of the P first-type radio signal(s), a level of the second target radio signal as a synchronization reference is the first synchronization level.

In one embodiment, when the first information indicates that the second target radio signal is not associated with any of the P first-type radio signal(s), a level of the second target radio signal as a synchronization reference is the second synchronization level.

In one embodiment, when the first information indicates that spatial Tx parameters of the second target radio signal is related to at least one of the P first-type radio signal(s), a level of the second target radio signal as a synchronization reference is the first synchronization level.

In one embodiment, when the first information indicates that spatial Tx parameters of the second target radio signal is independent of any of the P first-type radio signal(s), a level of the second target radio signal as a synchronization reference is the second synchronization level.

In one embodiment, when the first information is used for indicating that spatial Tx parameters of the second target radio signal is related to spatial Rx parameters of at least one of the P first-type radio signal(s), a level of the second target radio signal as a synchronization reference is the first synchronization level.

In one embodiment, when the first information is used for indicating whether spatial Tx parameters of the second target radio signal are independent of spatial Rx parameters of any of the P first-type radio signal(s), a level of the second target radio signal as a synchronization reference is the second synchronization level.

In one embodiment, when the first information is used for indicating that the second target antenna port group corresponding to the second target radio signal is related to at least one of the P first-type radio signal(s), a level of the second target radio signal as a synchronization reference is the first synchronization level.

In one embodiment, when the first information is used for indicating that the second target antenna port group corresponding to the second target radio signal is related to any one of the P first-type radio signal(s), a level of the second target radio signal as a synchronization reference is the second synchronization level.

In one embodiment, when the first information is used for indicating whether the second time-frequency resource is related to at least one of the P first-type radio signal(s), a level of the second target radio signal as a synchronization reference is the first synchronization level.

In one embodiment, when the first information is used for indicating whether the second time-frequency resource is related to any one of the P first-type radio signal(s), a level of the second target radio signal as a synchronization reference is the second synchronization level.

In one embodiment, whether each of the Q second-type radio signals can be selected as a synchronization reference being related to its comprised first-type information refers to that a priority of each of the Q second-type radio signals as a synchronization reference is indicated by its comprised first-type information.

In one embodiment, the first information indicates a level of the second target radio signal as a synchronization reference.

In one embodiment, the first information comprises one of TRUE or FALSE.

In one embodiment, when first information is TRUE, a level of the second target radio signal as a synchronization reference is the first synchronization level.

In one embodiment, when first information is FALSE, a level of the second target radio signal as a synchronization reference is the second synchronization level.

Embodiment 2

Figure 2:
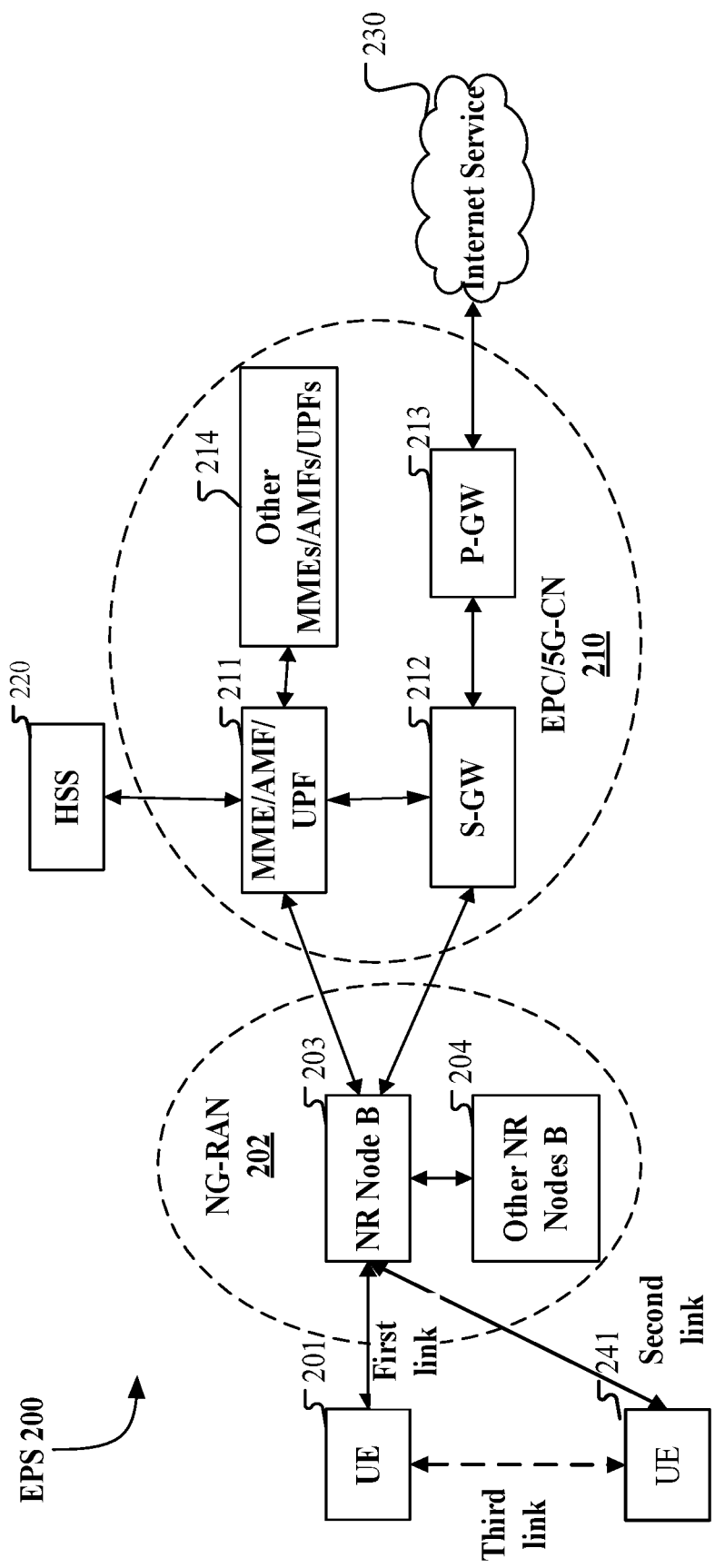
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other applicable terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices physical network equipment, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the terminal in the present disclosure comprises the UE 201.

In one embodiment, the base station in the present disclosure comprises the gNB 203.

In one embodiment, the second node in the present disclosure comprises the UE 241.

In one embodiment, the UE 201 supports Sidelink communication.

In one embodiment, the UE 241 supports Sidelink communication.

In one embodiment, the UE 201 supports beamforming-based sidelink communication.

In one embodiment, the UE 241 supports beamforming-based sidelink communication.

In one embodiment, the gNB 203 supports beamforming-based Downlink transmission.

In one embodiment, the UE 201 supports Massive MIMO-based sidelink communication.

In one embodiment, the UE 241 supports Massive MIMO-based sidelink communication.

In one embodiment, the gNB 203 supports Massive MIMO-based Downlink transmission.

In one embodiment, the UE 201 judges whether the UE 201 is in coverage in the present disclosure based on the target-specific signal.

In one embodiment, time and frequency acquired by the UE 201 based on the P first-type radio signals are synchronized.

In one embodiment, a transmitter of the P first-type radio signal(s) comprises a Global Navigation Satellite System (GNSS).

In one embodiment, a transmitter of the P first-type radio signal(s) comprises the gNB 203.

In one embodiment, the UE 241 selects a synchronization reference based on the Q0 second-type radio signal(s) of the Q second-type radio signals.

Embodiment 3

Figure 3:
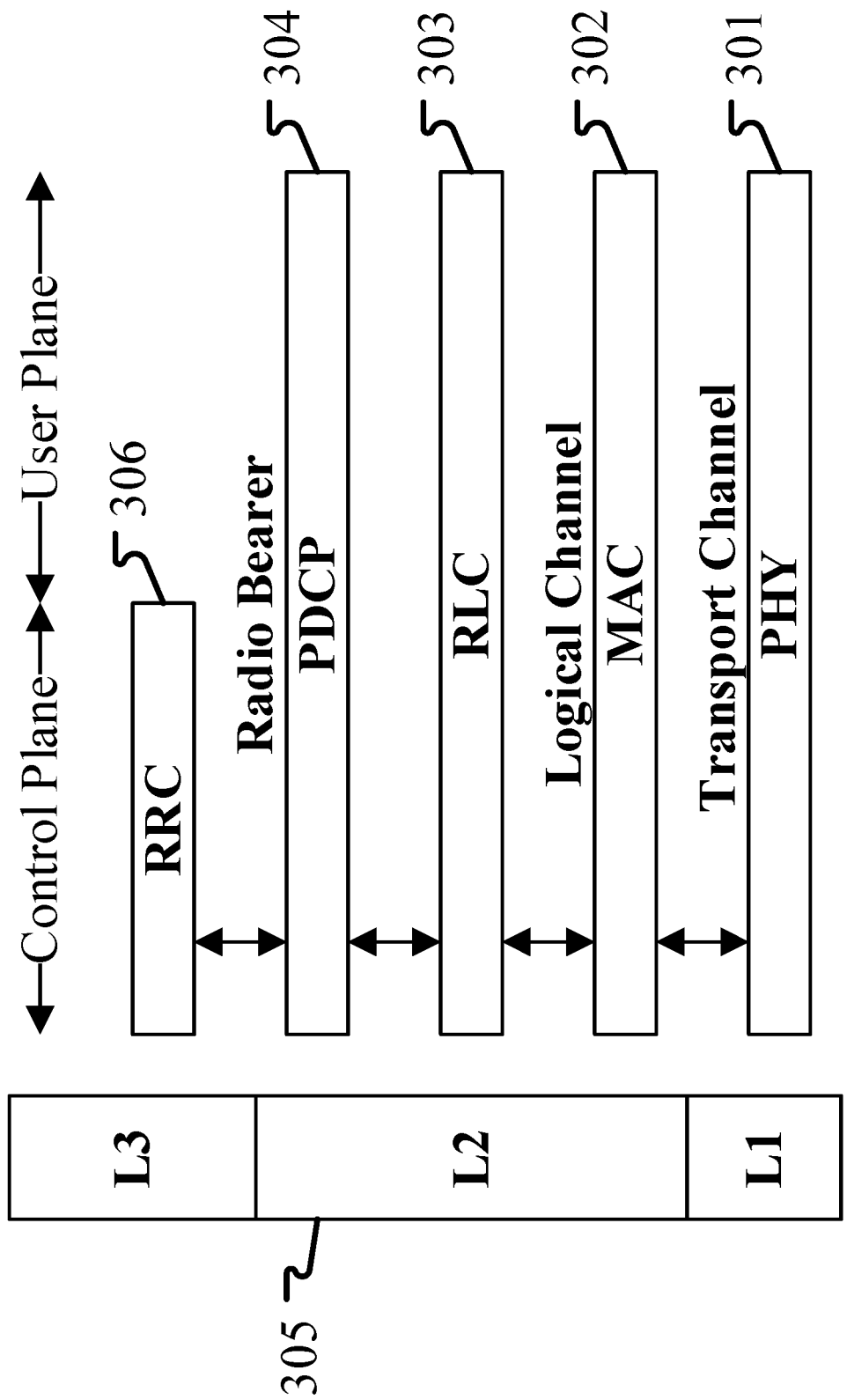
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. A layer above the layer 1 belongs to a higher layer. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for UE handover between base stations. The RLC sublayer 303 provides segmentation and reassembling of a higher-layer packet, retransmission of a lost packet, and reordering of a packet so as to compensate disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the base station is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the base station and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the UE in the present disclosure.

In one embodiment, the target-specific signal in the present disclosure is generated by the PHY 301.

In one embodiment, the P first-type radio signal(s) in the present disclosure is(are) generated by the PHY 301.

In one embodiment, the Q second-type radio signals in the present disclosure are generated by the PHY 301.

In one embodiment, the second sequence in the present disclosure is generated by the PHY 301.

In one embodiment, the second bit block in the present disclosure is generated by the PHY 301.

In one embodiment, the second bit block in the present disclosure is generated by the MAC sublayer 302.

In one embodiment, the second bit block in the present disclosure is generated by the RRC sublayer 306.

In one embodiment, the second bit block in the present disclosure is transferred from the L2 layer to the PHY 301.

In one embodiment, the second bit block in the present disclosure is transferred from the MAC sublayer 302 to the PHY 301.

In one embodiment, the Q pieces of first information in the present disclosure are generated by the RRC sublayer 306.

In one embodiment, the Q pieces of first information in the present disclosure are generated by the MAC sublayer 302.

In one embodiment, the Q pieces of first information in the present disclosure are generated by the PHY 301.

In one embodiment, the Q pieces of first information in the present disclosure are transferred from the L2 layer to the PHY 301.

In one embodiment, the Q pieces of first information in the present disclosure are transferred from the MAC sublayer 302 to the PHY 301.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the PHY 301.

In one embodiment, the second information in the present disclosure is transferred from the L2 layer to the PHY 301.

In one embodiment, the second information in the present disclosure is transferred from the MAC sublayer 302 to the PHY 301.

In one embodiment, the third information in the present disclosure is generated by the RRC sublayer 306.

In one embodiment, the third information in the present disclosure is generated by the MAC sublayer 302.

In one embodiment, the third information in the present disclosure is generated by the PHY 301.

In one embodiment, the third information in the present disclosure is transferred from the L2 layer to the PHY 301.

In one embodiment, the third information in the present disclosure is transferred from the MAC sublayer 302 to the PHY 301.

In one embodiment, the fourth information in the present disclosure is generated by the RRC sublayer 306.

In one embodiment, the fourth information in the present disclosure is generated by the MAC sublayer 302.

In one embodiment, the fourth information in the present disclosure is generated by the PHY 301.

In one embodiment, the fourth information in the present disclosure is transferred from the L2 layer to the PHY 301.

In one embodiment, the fourth information in the present disclosure is transferred from the MAC sublayer 302 to the PHY 301.

In one embodiment, the Q pieces of fifth information in the present disclosure are generated by the RRC sublayer 306.

In one embodiment, the Q pieces of fifth information in the present disclosure are generated by the MAC sublayer 302.

In one embodiment, the Q pieces of fifth information in the present disclosure are generated by the PHY 301.

In one embodiment, the Q pieces of fifth information in the present disclosure are transferred from the L2 layer to the PHY 301.

In one embodiment, the Q pieces of fifth information in the present disclosure are transferred from the MAC sublayer 302 to the PHY 301.

Embodiment 4

Figure 4:
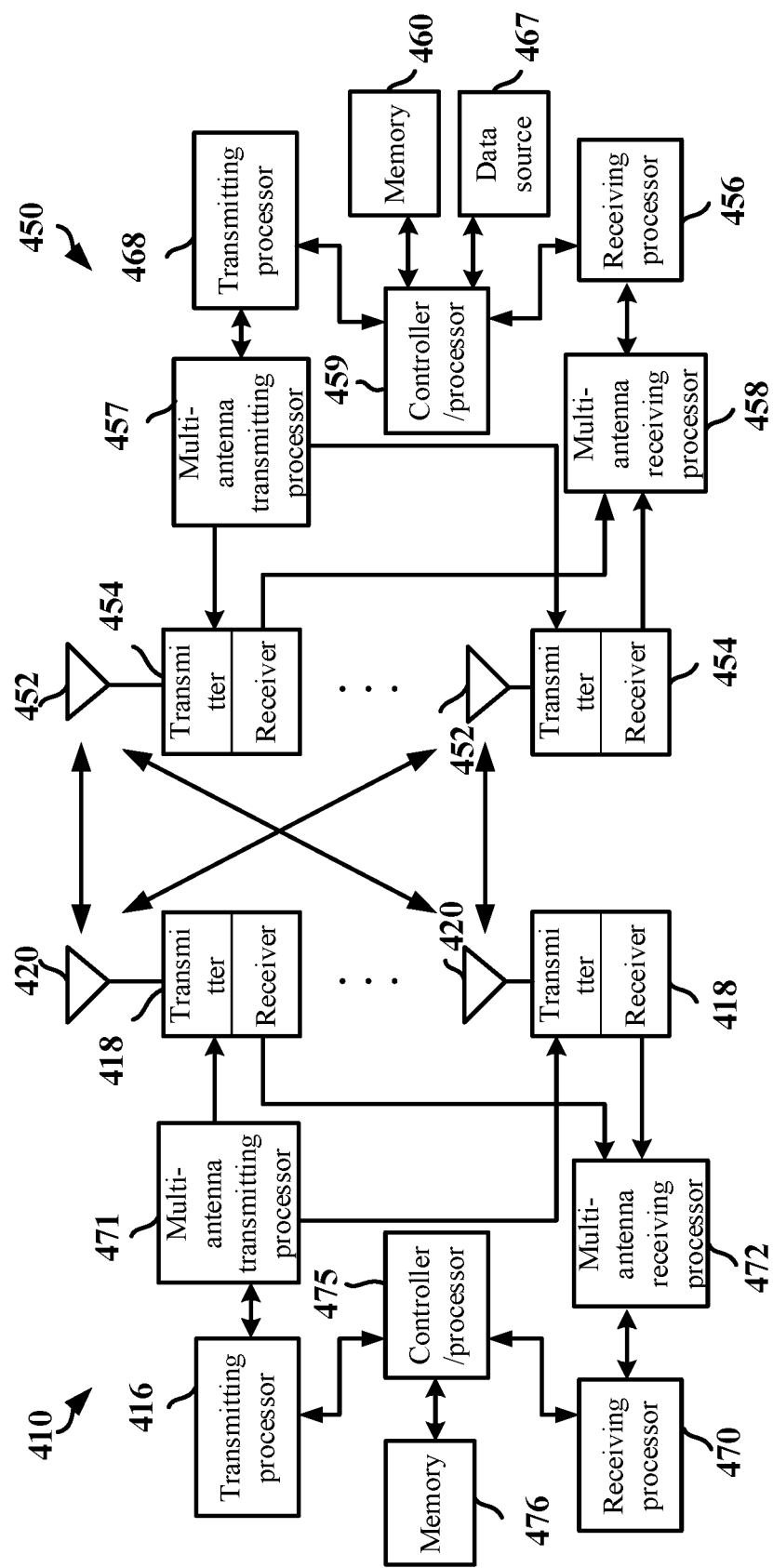
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 and a second communication device 450 that are in communication with each other in access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 implements the functionality of the L2 layer. In the transmission from the first communication device 410 to the first communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also responsible for a retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure a Forward Error Correction (FEC) at the second communication device 450 and constellation mapping corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In the transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In one embodiment, the base station in the present disclosure comprises the first communication device 410, and the first node in the present disclosure comprises the second communication device 450.

In one subembodiment of the above embodiment, the first communication device 410 comprises at least one controller/processor; the at least one controller/processor is responsible for HARQ operation.

In one subembodiment of the above embodiment, the second communication device 450 comprises at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a target-specific signal in the present disclosure; and judges whether the first node is in coverage according to a target received quality of the target-specific signal.

In one embodiment, the second communication device 450 comprises a memory that stores a computer readable instruction program. The computer readable instruction program generates an action when executed by at least one processor. The action includes: receiving a target-specific signal in the present disclosure; and judging whether the first node is in coverage according to target received quality of the target-specific signal.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives P first-type radio signal(s) in the present disclosure, P being a positive integer; each of the Q pieces of first-type information in the present disclosure is related to Spatial Rx parameter(s) of one of the P first-type radio signal(s).

In one embodiment, the second communication device 450 comprises a memory that stores a computer readable instruction program. The computer readable instruction program generates an action when executed by at least one processor. The action includes: receiving P first-type radio signal(s) in the present disclosure, P being a positive integer; each of the Q pieces of first-type information in the present disclosure is related to Spatial Rx parameter(s) of one of the P first-type radio signal(s).

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a target-specific signal in the present disclosure; and judges whether the first node is in coverage according to a target received quality of the target-specific signal.

In one embodiment, the first communication device 410 comprises a memory that stores a computer readable instruction program. The computer readable instruction program generates an action when executed by at least one processor. The action includes: transmitting a target-specific signal in the present disclosure; and judging whether the first node is in coverage according to a target received quality of the target-specific signal.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits P first-type radio signal(s) in the present disclosure, P being a positive integer; each of the Q pieces of first-type information in the present disclosure is related to Spatial Rx parameter(s) of one of the P first-type radio signal(s).

In one embodiment, the first communication device 410 comprises a memory that stores a computer readable instruction program. The computer readable instruction program generates an action when executed by at least one processor. The action includes: transmitting P first-type radio signal(s) in the present disclosure, P being a positive integer; each of the Q pieces of first-type information in the present disclosure is related to Spatial Rx parameter(s) of one of the P first-type radio signal(s).

In one embodiment, at least one of the antenna 452, the receiver 454, the receiving processor 456, the multi-antenna receiving processor 458, the controller/processor 459, the memory 460, or the data source 467 is used for receiving the target-specific signal of the present disclosure; and at least one of the antenna 420, the transmitter 418, the transmitting processor 416, the multi-antenna transmitting processor 471, the controller/processor 475, or the memory 476 is used for transmitting the target-specific signal of the present disclosure.

In one embodiment, at least one of the antenna 452, the receiver 454, the receiving processor 456, the multi-antenna receiving processor 458, the controller/processor 459, the memory 460, or the data source 467 is used for receiving the P first-type radio signal(s) of the present disclosure; and at least one of the antenna 420, the transmitter 418, the transmitting processor 416, the multi-antenna transmitting processor 471, the controller/processor 475, or the memory 476 is used for transmitting the P first-type radio signal(s) of the present disclosure.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 performs digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node and the second node are respectively UEs.

In one subembodiment of the above embodiment, the first node is a relay node, and the second node is a UE.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: judges whether the second communication device 450 is in coverage in the present disclosure; and transmits Q second-type radio signals in the present disclosure; the Q second-type radio signals respectively comprise the Q pieces of first-type information; whether each of the Q second-type radio signals can be selected as a synchronization reference is related to its comprised first-type information; the Q pieces of first-type information are independently generated, Q being a positive integer greater than 1.

In one embodiment, the second communication device 450 comprises a memory that stores a computer readable instruction program. The computer readable instruction program generates an action when executed by at least one processor. The action includes: judging whether the second communication device 450 is in coverage in the present disclosure; and transmitting Q second-type radio signals in the present disclosure; the Q second-type radio signals respectively comprise the Q pieces of first-type information; whether each of the Q second-type radio signals can be selected as a synchronization reference is related to its comprised first-type information; the Q pieces of first-type information are independently generated, Q being a positive integer greater than 1.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: judges whether the second communication device 450 is in coverage in the present disclosure; and transmits Q second-type radio signals in the present disclosure; the Q second-type radio signals respectively comprise the Q pieces of first-type information; whether each of the Q second-type radio signals can be selected as a synchronization reference is related to its comprised first-type information; whether the Q pieces of first-type information are independently generated is related to whether the first node is in coverage, Q being a positive integer greater than 1.

In one embodiment, the second communication device 450 comprises a memory that stores a computer readable instruction program. The computer readable instruction program generates an action when executed by at least one processor. The action includes: judging whether the second communication device 450 is in coverage in the present disclosure; and transmitting Q second-type radio signals in the present disclosure; the Q second-type radio signals respectively comprise the Q pieces of first-type information; whether each of the Q second-type radio signals can be selected as a synchronization reference is related to its comprised first-type information; whether the Q pieces of first-type information are independently generated is related to whether the first node is in coverage, Q being a positive integer greater than 1.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives Q0 second-type radio signal(s) of Q second-type radio signals in the present disclosure; the Q second-type radio signals respectively comprise Q pieces of first-type information; whether each of the Q0 second-type radio signal(s) can be selected as a synchronization reference is related to its comprised first-type information; the Q pieces of first-type information are independently generated, or, whether the Q pieces of first-type information are independently generated is related to whether the transmitter of the Q second-type radio signals is in coverage, Q being a positive integer greater than 1, Q0 being a positive integer no greater than the Q.

In one embodiment, the first communication device 410 comprises a memory that stores a computer readable instruction program. The computer readable instruction program generates an action when executed by at least one processor. The action includes: receiving Q0 second-type radio signal(s) of Q second-type radio signals in the present disclosure; the Q second-type radio signals respectively comprise Q pieces of first-type information; whether each of the Q0 second-type radio signal(s) can be selected as a synchronization reference is related to its comprised first-type information; the Q pieces of first-type information are independently generated, or, whether the Q pieces of first-type information are independently generated is related to whether the transmitter of the Q second-type radio signals is in coverage, Q being a positive integer greater than 1, Q0 being a positive integer no greater than the Q.

In one embodiment, at least one of the antenna 452, the receiver 454, the receiving processor 456, the multi-antenna receiving processor 458, the controller/processor 459, the memory 460, or the data source 467 is used for judging whether the second communication device 450 is in coverage of the present disclosure.

In one embodiment, at least one of the antenna 452, the receiver 454, the receiving processor 456, the multi-antenna receiving processor 458, the controller/processor 459, the memory 460, or the data source 467 is used for transmitting the Q second-type radio signals of the present disclosure;

In one embodiment, at least one of the antenna 420, the transmitter 418, the transmitting processor 416, the multi-antenna transmitting processor 471, the controller/processor 475, or the memory 476 is used for receiving the Q0 second-type radio signal(s) of the Q second-type radio signals of the present disclosure.

In one embodiment, at least one of the antenna 420, the receiver 418, the receiving processor 470, the multi-antenna receiving processor 472, the controller/processor 475, or the memory 476 is used for selecting a synchronization reference.

Embodiment 5

Figure 5:
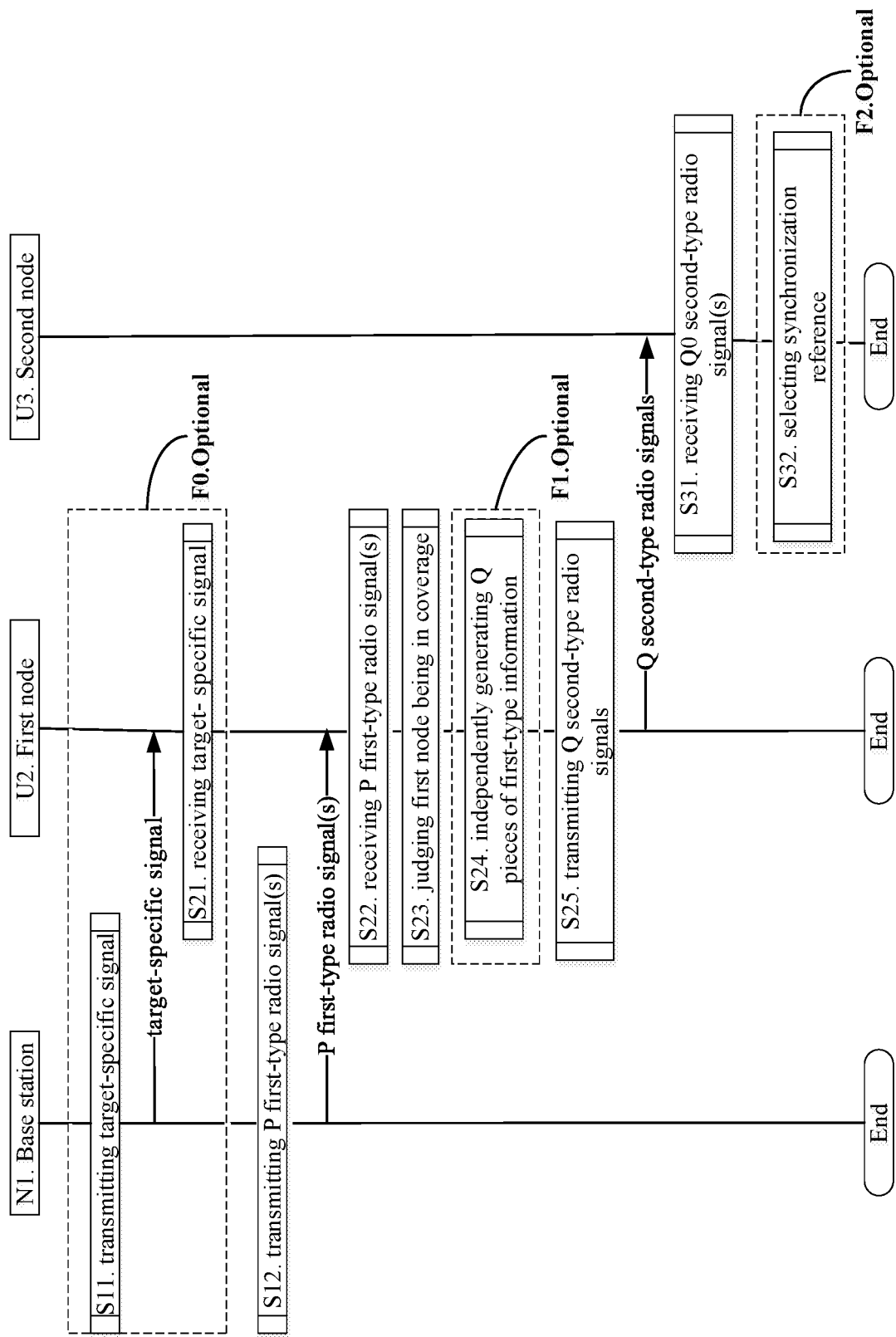
FIG. 5 illustrates a flowchart of a radio signal transmission according to one embodiment of the present disclosure.

Embodiment 5 illustrates a flowchart of a radio signal transmission according to one embodiment in the present disclosure, as shown in FIG. 5. In FIG. 5, the base station N1 is a maintenance base station for a serving cell of the first node U2, and the second node U3 is a communication node for the first node U2 that transmits via sidelink. In FIG. 5, steps in dotted-line-framed boxes F0, F1 and F2 are respectively optional.

The base station N1 transmits a target-specific signal in step S11; and transmits P first-type radio signal(s) in step S12.

The first node U2 receives a target-specific signal in step S21; receives P first-type radio signal(s) in step S22; judges whether the first node U2 is in coverage in step S23; independently generates Q pieces of first-type information in step S24; and transmits Q second-type radio signals in step S25.

The second node U3 receives Q0 second-type radio signal(s) of Q second-type radio signals in step S31; and selects a synchronization reference in step S32.

In Embodiment 5, the first node U2 judges whether it is in coverage according to a target received quality of the target-specific signal; the Q second-type radio signals respectively comprise Q pieces of first-type information; whether each of the Q second-type radio signals can be selected as a synchronization reference is related to its comprised first-type information; the Q pieces of first-type information are independently generated, or, whether the Q pieces of first-type information are independently generated is related to whether the first node is in coverage, Q being a positive integer greater than 1; each of the Q pieces of first-type information is related to Spatial Rx parameter(s) of one of the P first-type radio signal(s), P being a positive integer.

In one embodiment, when the U2 is in coverage, the Q pieces of first-type information are independently generated.

In one embodiment, when the first node is out of coverage, the Q first-type information are not independently generated.

In one embodiment, when the P first-type radio signal(s) comprises(comprise) the target-specific signal, steps in box F0 in FIG. 5 do not exist.

In one embodiment, when the U2 is out of coverage, the step in box F1 in FIG. 5 exists.

In one embodiment, when the U3 does not perform sidelink communication, the step F2 in FIG. 5 does not exist.

In one embodiment, when the U3 does not perform synchronization operations, the step F2 in FIG. 5 does not exist.

In one embodiment, steps in box F0 and box F1 in FIG. 5 all exist.

In one embodiment, steps in box F1 and box F2 in FIG. 5 all exist.

In one embodiment, steps in box F0 and box F1 in FIG. 5 do not exist.

In one embodiment, at least one of the P first-type radio signal(s) is used by the first node for determining a transmission timing of the Q second-type radio signals.

In one embodiment, a reception timing of at least one of the P first-type radio signal(s) is used by the first node for determining a transmission timing of the Q second-type radio signals.

In one embodiment, a transmitter of the P first-type radio signal(s) comprises a Global Navigation Satellite System (GNSS).

In one embodiment, a transmitter of the P first-type radio signal(s) comprises a cell.

In one embodiment, a transmitter of the P first-type radio signal(s) comprises a serving cell.

In one embodiment, a transmitter of the P first-type radio signal(s) comprises a Primary cell (PCell).

In one embodiment, a transmitter of the P first-type radio signal(s) comprises a Secondary cell (SCell).

In one embodiment, a transmitter of the P first-type radio signal(s) comprises a Synchronization Reference User Equipment (SyncRefUE).

In one embodiment, a transmitter of the P first-type radio signal(s) comprises an In-Coverage SynRefUE.

In one embodiment, a transmitter of the P first-type radio signal(s) comprises an Out-of-Coverage SynRefUE.

In one embodiment, one of the P first-type radio signal(s) comprises a Synchronisation Signal (SS).

In one embodiment, one of the P first-type radio signal(s) comprises a Primary Synchronisation Signal (PSS).

In one embodiment, one of the P first-type radio signal(s) comprises a Secondary Synchronisation Signal (PSS).

In one embodiment, one of the P first-type radio signal(s) comprises a physical broadcast signal.

In one embodiment, one of the P first-type radio signal(s) comprises a PBCH Demodulation Reference Signal (PBCH-DMRS).

In one embodiment, one of the P first-type radio signal(s) comprises a Sidelink Synchronisation Signal (SLSS).

In one embodiment, one of the P first-type radio signal(s) comprises a Primary Sidelink Synchronisation Signal (PSSS).

In one embodiment, one of the P first-type radio signal(s) comprises a Secondary Sidelink Synchronisation Signal (SSSS).

In one embodiment, one of the P first-type radio signal(s) comprises a Sidelink Broadcast Signal (SBS).

In one embodiment, one of the P first-type radio signal(s) comprises a PSBCH Demodulation Reference Signal (PSBCH-DMRS).

In one embodiment, one of the P first-type radio signal(s) comprises a Reference Signal (RS).

In one embodiment, one of the P first-type radio signal(s) comprises an SS/PBCH block (SSB).

In one embodiment, one of the P first-type radio signal(s) comprises a Discovery Reference Signal (DRS).

In one embodiment, one of the P first-type radio signal(s) is transmitted on a Physical Broadcast Channel (PBCH).

In one embodiment, one of the P first-type radio signal(s) is transmitted on a Narrowband PBCH(NPBCH).

In one embodiment, one of the P first-type radio signal(s) is transmitted on a Sidelink Broadcast Channel (SL-BCH).

In one embodiment, one of the P first-type radio signal(s) is transmitted on a Physical Sidelink Broadcast Signal (PSBCH).

In one embodiment, one of the P first-type radio signal(s) is transmitted on a Physical Downlink Control Channel (PDCCH).

In one embodiment, one of the P first-type radio signal(s) is transmitted on a Physical Downlink Shared Channel (PDSCH).

In one embodiment, one of the P first-type radio signal(s) is transmitted on a Physical Sidelink Control Channel (PSCCH).

In one embodiment, one of the P first-type radio signal(s) is transmitted on a Physical Sidelink Shared Channel (PSSCH).

In one embodiment, one of the P first-type radio signal(s) is transmitted on a Physical Sidelink Discovery Channel (PSDCH).

In one embodiment, a first target radio signal is one of the P first-type radio signal(s).

In one embodiment, the first target radio signal comprises a Physical Layer Cell Identity (PCID).

In one embodiment, the first target radio signal is a sequence.

In one embodiment, the first target radio signal comprises a first sequence.

In one embodiment, the first sequence is a pseudo-random sequence.

In one embodiment, the first sequence is a Gold sequence.

In one embodiment, the first sequence is an M sequence.

In one embodiment, the first sequence is a Zadeoff-Chu sequence.

In one embodiment, a first sequence is used for generating the first target radio signal.

In one embodiment, the first target radio signal is an output after the first sequence sequentially through Discrete Fourier Transform (DFT), Mapping to Physical Resources, Baseband Signal Generation, and Modulation and Upconversion.

In one embodiment, the first target radio signal is an output after the first sequence sequentially through Filter, and Modulation and Upconversion.

In one embodiment, the first target radio signal is an output after the first sequence sequentially through Precoding, Mapping to Physical Resources, Baseband Signal Generation, and Modulation and Upconversion.

In one embodiment, the first target radio signal is an output of the first sequence through at least one of modulation, DFT, precoding, Mapping to Physical Resources, Baseband Signal Generation, Filter, or Modulation and Upconversion.

In one embodiment, the first target radio signal is a bit block.

In one embodiment, the first target radio signal comprises a first bit block, the first bit block comprising a positive integer number of sequentially-arranged bits.

In one embodiment, the first bit block comprises one or more fields in a Master Information Block (MIB).

In one embodiment, the first bit block comprises all or part of bits of a TB.

In one embodiment, the first bit block comprises all or part of bits of a CB.

In one embodiment, the first target radio signal is obtained by all or part of bits of the first bit block sequentially through first-level scrambling, TB-level CRC Attachment, Channel Coding, Rate Matching, second-level scrambling, Modulation, Layer Mapping, Transform Precoding, Precoding, Mapping to Physical Resources, Baseband Signal Generation, and Modulation and Upconversion.

In one embodiment, the first target radio is an output of all or part of bits of the first bit block sequentially through at least one of first-level scrambling, TB-level CRC attachment, Segmentation, CB-level CRC attachment, channel coding, rate matching, Concatenation, second-level scrambling, modulation, layer mapping, Spreading, Transform Precoding, precoding, Mapping to Physical Resources, Baseband Signal Generation or Modulation and Upconversion.

In one embodiment, the PCID is used for scrambling the first target radio signal.

Embodiment 6

Figure 6:
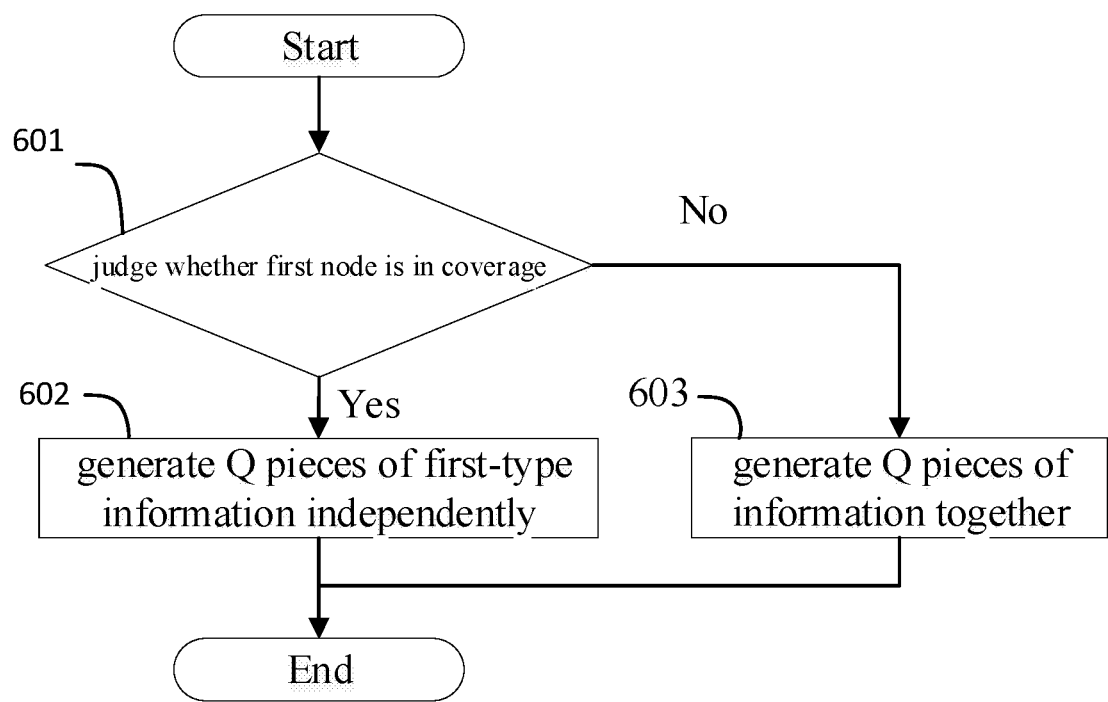
FIG. 6 illustrates a flowchart of determining whether Q pieces of first-type information are independently generated according to one embodiment of the present disclosure.

Embodiment 6 illustrates a flowchart of determining whether Q pieces of first-type information are independently generated according to one embodiment of the present disclosure, as shown in FIG. 6.

In Embodiment 6, when the first node is in coverage, the Q pieces of first-type information are independently generated; and when the first node is out of coverage, the Q pieces of first-type information are not independently generated.

In one embodiment, the Q pieces of first-type information being independently generated comprises: any two of the Q pieces of first-type information cannot be considered necessarily equal.

In one embodiment, the Q pieces of first-type information being independently generated comprises: one of the Q pieces of first-type information cannot be used for inferring another of the Q pieces of first-type information.

In one embodiment, the Q pieces of first-type information not being independently generated comprises: the Q pieces of first-type information are considered to be equal.

In one embodiment, the Q pieces of first-type information not being independently generated comprises: one of the Q pieces of first-type information can be used for inferring another of the Q pieces of first-type information.

In one embodiment, when first node is in coverage, the Q pieces of first-type information are independently generated.

In one embodiment, when first node is out of coverage, the Q pieces of first-type information are independently generated.

In one embodiment, the first information is used for generating the second target radio signal.

In one embodiment, the first information is used for scrambling the second target radio signal.

In one embodiment, the first information is used for generating the second sequence.

In one embodiment, the first information is used for selecting the second sequence out of a positive integer number of candidate sequence(s), and the second sequence is one of the positive integer number of candidate sequence(s).

In one embodiment, the first information is used for determining an SLSSID of the second target radio signal.

In one embodiment, the first information is used for generating an initial value of the second sequence.

In one embodiment, the first information is used for generating a cyclic shift of the second sequence.

In one embodiment, the first information is used for generating a sequence segment of the second sequence.

In one embodiment, the first information is used for generating the second bit block.

In one embodiment, the second bit block comprises the first information.

In one embodiment, the first information is used for generating a Cyclic Redundancy Check Mask (CRC-Mask) of the second target radio signal.

In one embodiment, the first information is used for selecting a CRC-Mask of the second target radio signal out of a positive integer number of candidate CRC-Mask(s), a CRC-Mask of the second target radio signal being one of the positive integer number of candidate CRC-Mask(s).

In one embodiment, the first information is used for generating a first-level scrambling sequence of the second target radio signal.

In one embodiment, the first information is used for generating a second-level scrambling sequence of the second target radio signal.

In one embodiment, the first information is jointly indicated by any number embodiments among the above fourteen embodiments.

Embodiment 7

Figure 7:
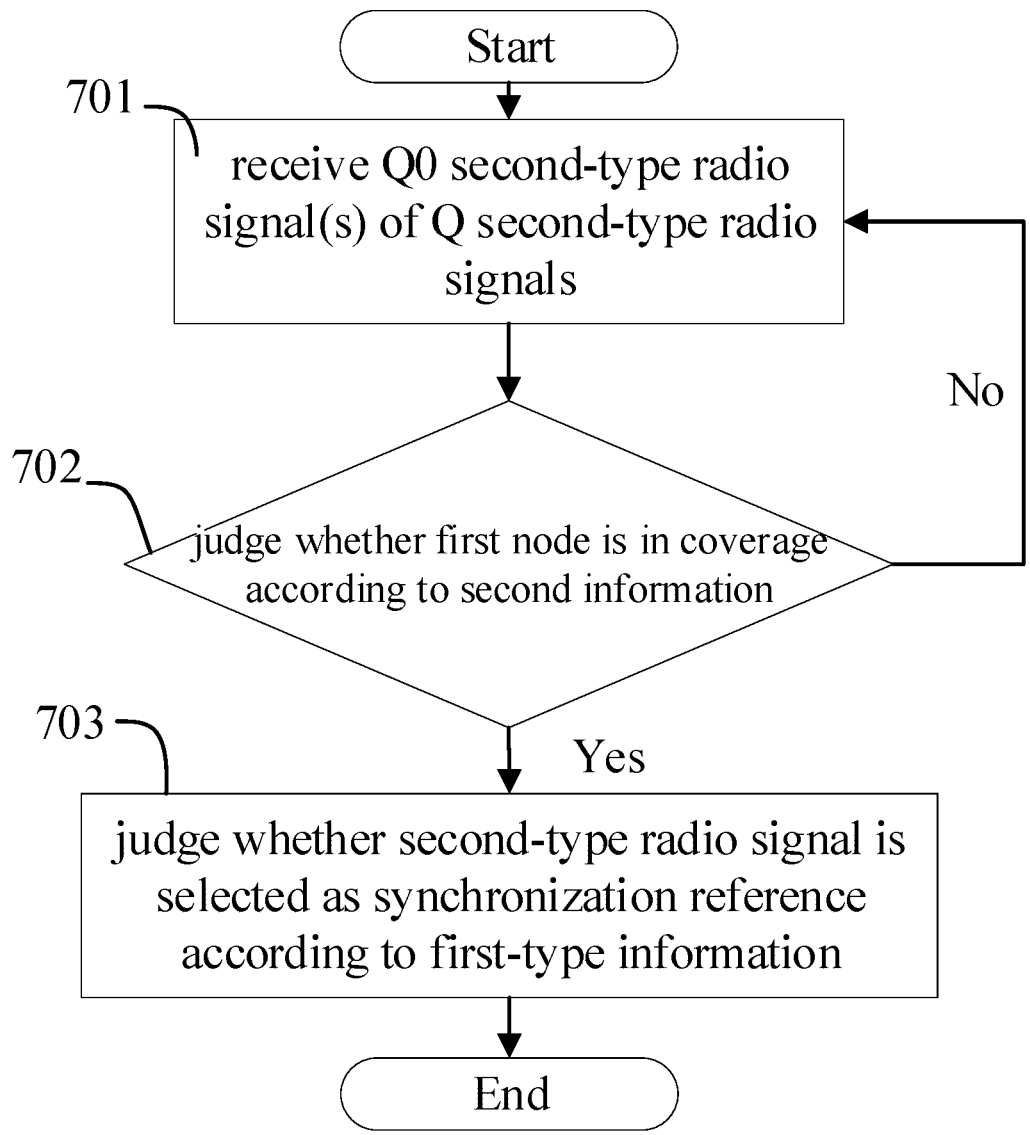
FIG. 7 illustrates a flowchart of selecting a synchronization reference according to one embodiment of the present disclosure.

Embodiment 7 illustrates a flowchart of selecting a synchronization reference according to one embodiment of the present disclosure, as shown in FIG. 7.

In Embodiment 7, the second node in the present disclosure receives Q0 second-type radio signal(s) of Q second-type radio signals; the Q second-type radio signals respectively comprise Q pieces of first-type information; whether each of the Q0 second-type radio signal(s) can be selected as a synchronization reference is related to its comprised first-type information; the Q pieces of first-type information are independently generated, Q being a positive integer greater than 1, Q0 being a positive integer no greater than the Q.

In Embodiment 7, Q0 second-type radio signal(s) of Q second-type radio signals is(are) received; the Q second-type radio signals respectively comprise Q pieces of first-type information; whether each of the Q0 second-type radio signal(s) can be selected as a synchronization reference is related to its comprised first-type information; whether the Q pieces of first-type information are independently generated is related to whether the transmitter of the Q second-type radio signals is in coverage, Q being a positive integer greater than 1, Q0 being a positive integer no greater than the Q.

In one embodiment, the transmitter of the Q second-type radio signals comprises a first node in the present disclosure.

In one embodiment, whether any of the Q0 second-type radio signal(s) can be selected as a synchronization reference is related to its comprised first-type information in the any one second-type radio signal.

In one embodiment, when the first information indicates that the one spatial Tx parameter corresponding to the second target radio signal is related to at least one of the P first-type radio signal(s), the level of the synchronization reference of the second target radio signal as the synchronization reference is the first synchronization level; otherwise the level of the synchronization reference of the second target radio signal as the synchronization reference is the second synchronization level.

In one embodiment, when the first information indicates whether the one spatial Tx parameter corresponding to the second target radio signal is related to the one spatial Rx parameter corresponding to at least one of the P first-type radio signal(s), the level of the synchronization reference of the second target radio signal as the synchronization reference is the first synchronization level; otherwise the level of the synchronization reference of the second target radio signal as the synchronization reference is the second synchronization level.

In one embodiment, when the first information indicates that the first antenna port group corresponding to the second target radio signal is related to at least one of the P first-type radio signal(s), the level of the synchronization reference of the second target radio signal as the synchronization reference is the first synchronization level; otherwise the level of the synchronization reference of the second target radio signal as the synchronization reference is the second synchronization level.

In one embodiment, when the first information indicates whether the first antenna port group is associated with at least one of the P first-type radio signal(s), the level of the synchronization reference of the second target radio signal as the synchronization reference is the first synchronization level; otherwise the level of the synchronization reference of the second target radio signal as the synchronization reference is the second synchronization level.

In one embodiment, when the first information indicates whether the first antenna port group is associated with the one spatial Rx parameter of at least one of the P first-type radio signal(s), the level of the synchronization reference of the second target radio signal as the synchronization reference is the first synchronization level; otherwise the level of the synchronization reference of the second target radio signal as the synchronization reference is the second synchronization level.

In one embodiment, when the first information indicates whether the second time-frequency resource is related to at least one of the P first-type radio signal(s), the level of the synchronization reference of the second target radio signal as the synchronization reference is the first synchronization level; otherwise the level of the synchronization reference of the second target radio signal as the synchronization reference is the second synchronization level.

In one embodiment, when the first information indicates whether the second time-frequency resource is related to the one first-type time-frequency resource occupied by at least one of the P first-type radio signal(s), the level of the synchronization reference of the second target radio signal as the synchronization reference is the first synchronization level; otherwise the level of the synchronization reference of the second target radio signal as the synchronization reference is the second synchronization level.

Embodiment 8

Figure 8:
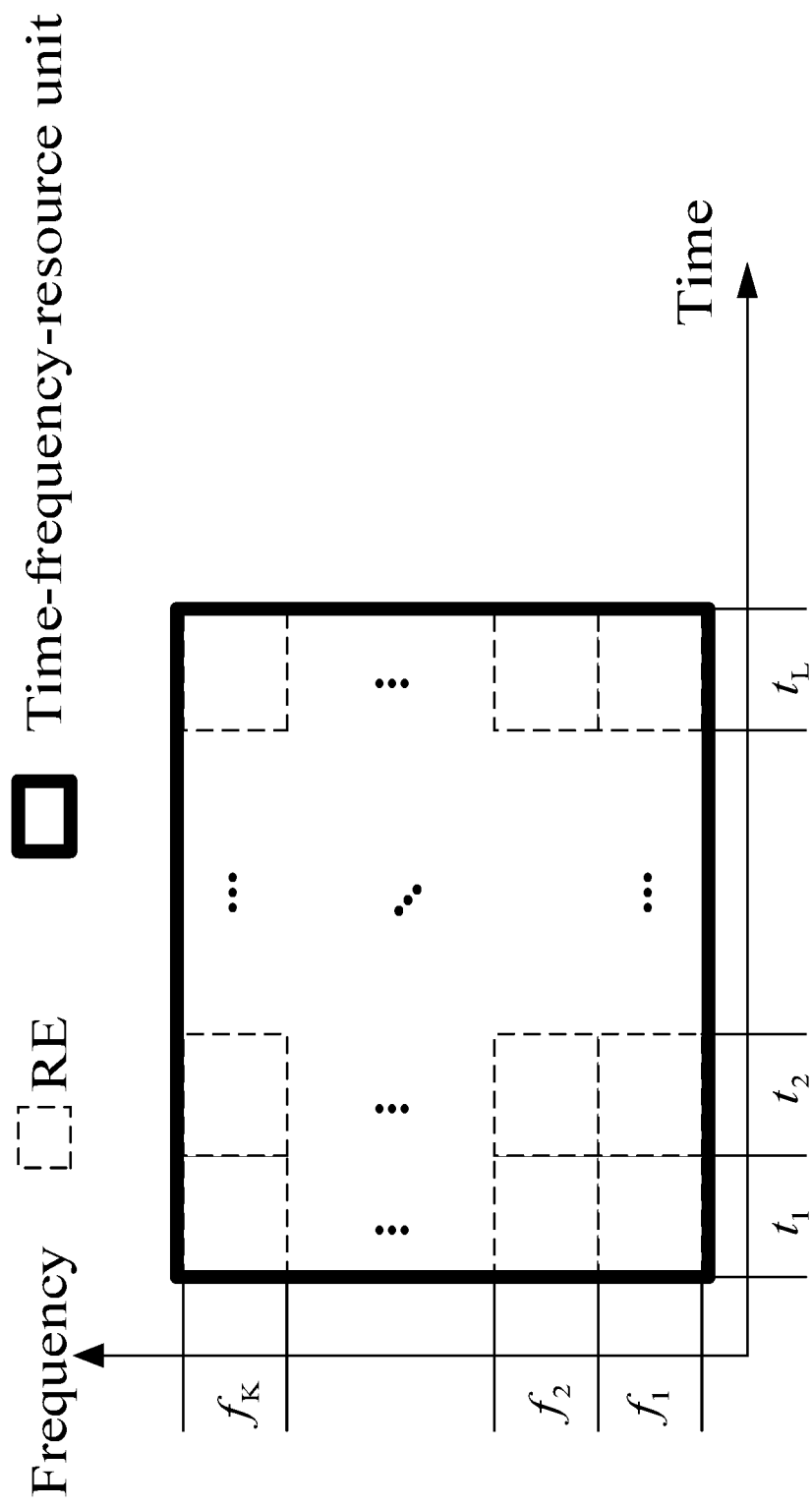
FIG. 8 illustrates a schematic diagram of a time-frequency-resource unit according to one embodiment of the present disclosure.

Embodiment 18 illustrates a schematic diagram of a time-frequency resource unit according to one embodiment of the present disclosure, as shown in FIG. 8.

In FIG. 18, a dotted small box represents a Resource Element (RE), and a solid box represents a time-frequency resource unit. In FIG. 18, a time-frequency resource unit occupies K subcarrier(s) in frequency domain, and L multicarrier symbol(s) in time domain, the K and the L being positive integers. In FIG. 18, t1, t2, . . . , tL represent(s) the L symbol(s), and f1, f2, . . . , fK represent(s) the K subcarrier(s).

In one embodiment, a time-frequency resource unit occupies K subcarrier(s) in frequency domain, and L multicarrier symbol(s) in time domain, the K and the L being positive integers.

In one embodiment, the K is equal to 12.

In one embodiment, the K is equal to 72.

In one embodiment, the K is equal to 127.

In one embodiment, the K is equal to 240.

In one embodiment, the L is equal to 1.

In one embodiment, the L is equal to 2.

In one embodiment, the L is no greater than 14.

In one embodiment, any of the L multicarrier symbol(s) is at least one of a Frequency Division Multiple Access (FDMA), an Orthogonal Frequency Division Multiplexing (OFDM), a Single-Carrier Frequency Division Multiple Access (SC-FDMA), a Discrete Fourier Transform Spread Orthogonal Frequency Division Multiplexing (DFTS-OFDM), a Filter Bank Multi-Carrier (FBMC), an Interleaved Frequency Division Multiple Access (IFDMA).

In one embodiment, the time-frequency resource unit consists of R RE(s), the R being a positive integer.

In one embodiment, the time-frequency resource unit comprises R RE(s), the R being a positive integer.

In one embodiment, any of the R RE(s) occupies a multicarrier symbol in time domain and a subcarrier in frequency domain.

In one embodiment, a symbol duration of a multicarrier symbol of one of the R RE(s) is inversely proportional to a subcarrier spacing (SCS) of the one RE, a symbol duration of a multicarrier symbol of the one RE is a time length occupied by a multicarrier symbol of the one RE in time domain, and an SCS of the one RE is a frequency width occupied by a subcarrier of the one RE in frequency domain.

In one embodiment, an SCS of the one RE is measured by Hertz (Hz).

In one embodiment, an SCS of the one RE is measured by Kilohertz (kHz).

In one embodiment, an SCS of the one RE is measured by Megahertz (MHz).

In one embodiment, a symbol length of a multicarrier symbol of the one RE is measured by sampling point.

In one embodiment, a symbol length of a multicarrier symbol of the one RE is measured by us.

In one embodiment, a symbol length of a multicarrier symbol of the one RE is measured by ms.

In one embodiment, the shorter an SCS of the one RE is, the longer a symbol duration of a corresponding multicarrier symbol of the one RE is.

In one embodiment, an SCS of the one RE is at least one of 1.25 khz, 2.5 KHz, 5 KHz, 15 KHz, 30 kHz, 60 KHZ, 120 kHz or 240 khz.

In one embodiment, a product of the K and the L of the time-frequency resource unit is no less than the R.

In one embodiment, the time-frequency resource unit does not comprise an RE allocated to a Guard Period (GP).

In one embodiment, the time-frequency resource unit does not comprise an RE allocated to a Reference Signal (RS).

In one embodiment, the time-frequency resource unit does not comprise an RE allocated to an SLSS.

In one embodiment, the time-frequency resource unit does not comprise an RE allocated to an PSSS.

In one embodiment, the time-frequency resource unit does not comprise an RE allocated to an SSSS.

In one embodiment, the time-frequency resource unit does not comprise an RE allocated to a PSBCH.

In one embodiment, the time-frequency resource unit does not comprise an RE allocated to a PSBCH-DMRS.

In one embodiment, the time-frequency resource unit does not comprise an RE allocated to a PRACH.

In one embodiment, the time-frequency resource unit does not comprise an RE allocated to a NPRACH.

In one embodiment, the time-frequency resource unit does not comprise an RE allocated to a PUCCH.

In one embodiment, the time-frequency resource unit does not comprise an RE allocated to an SPUCCH.

In one embodiment, the time-frequency resource unit does not comprise an RE allocated to a PUSCH.

In one embodiment, the time-frequency resource unit does not comprise an RE allocated to an NPUSCH.

In one embodiment, the time-frequency resource unit comprises a positive integer number of Resource Block(s) (RB).

In one embodiment, the time-frequency resource unit belongs to an RB.

In one embodiment, the time-frequency resource unit is equal to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB pair(s)

In one embodiment, the time-frequency resource unit belongs to a PRB.

In one embodiment, the time-frequency resource unit is equal to one PRB in frequency domain.

In one embodiment, the time-frequency resource unit comprises a positive integer number of Virtual Resource Block(s) (VRB).

In one embodiment, the time-frequency resource unit belongs to a VRB.

In one embodiment, the time-frequency resource unit is equal to a VRB in frequency domain.

In one embodiment, the time-frequency resource unit comprises a positive integer number of PRB pair(s)

In one embodiment, the time-frequency resource unit belongs to a PRB pair.

In one embodiment, the time-frequency resource unit is equal to a PRB pair in frequency domain.

In one embodiment, the time-frequency resource unit comprises a positive integer number of frame(s).

In one embodiment, the time-frequency resource unit belongs to a frame.

In one embodiment, the time-frequency resource unit is equal to a frame in time domain.

In one embodiment, the time-frequency resource unit comprises a positive integer number of subframe(s).

In one embodiment, the time-frequency resource unit belongs to a sub frame.

In one embodiment, the time-frequency resource unit is equal to a subframe in time domain.

In one embodiment, the time-frequency resource unit comprises a positive integer number of slot(s).

In one embodiment, the time-frequency resource unit belongs to a slot.

In one embodiment, the time-frequency resource unit is equal to a slot in time domain.

In one embodiment, the time-frequency resource unit comprises a positive integer number of Symbol(s).

In one embodiment, the time-frequency resource unit belongs to a Symbol.

In one embodiment, the time-frequency resource unit is equal to a Symbol in time domain.

In one embodiment, the time-frequency resource unit belongs to a PRACH.

In one embodiment, the time-frequency resource unit belongs to a NPRACH.

In one embodiment, the time-frequency resource unit belongs to a PUSCH.

In one embodiment, the time-frequency resource unit belongs to an NPUSCH.

In one embodiment, the time-frequency resource unit belongs to a PUCCH.

In one embodiment, the time-frequency resource unit belongs to an SPUCCH.

In one embodiment, the time-frequency resource unit comprise an RE allocated to an RS.

In one embodiment, the time-frequency resource unit comprise an RE allocated to a GP.

Embodiment 9

Figure 9:
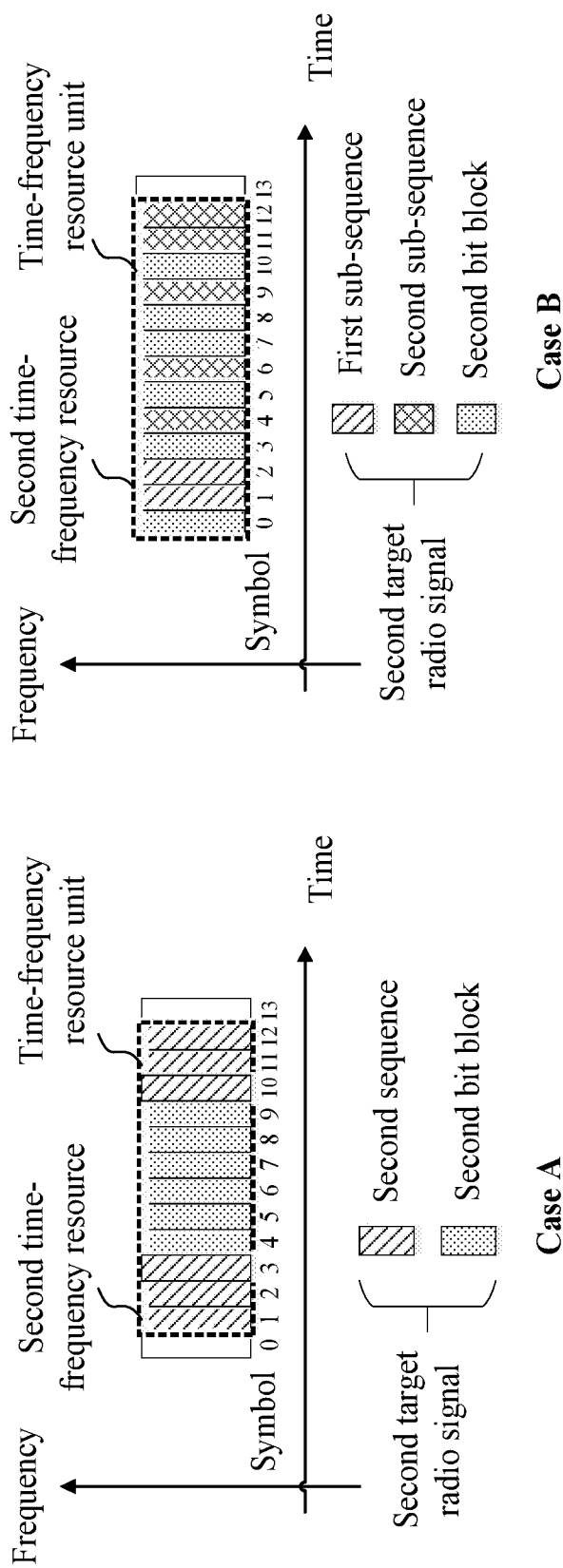
FIG. 9 illustrates a schematic diagram of a time-frequency-resource unit occupied by a second time-frequency resource according to one embodiment of the present disclosure.

Embodiment 9 illustrates a schematic diagram of time-frequency-resource unit occupied by a second time-frequency resource according to one embodiment of the present disclosure, as shown in FIG. 9.

In FIG. 9, in case A, the second target radio signal in the present disclosure comprises a second sequence in the present disclosure and a second bit block in the present disclosure, a solid slash-filled box represents a second sequence, and a solid dot-filled box represents a second bit block. In case B, the second target radio signal in the present disclosure comprises a first subsequence in the present disclosure, a second subsequence in the present disclosure and a second bit block in the present disclosure, a solid slash-filled box represents a first subsequence, a solid cross-line-filled box represents a second subsequence, and a solid dot-filled box represents a second bit block; a solid and dotted box represents a second time-frequency resource, and the second target radio signal is transmitted on the second time-frequency resource.

In one embodiment, the second target radio signal is transmitted on a second time-frequency resource.

In one embodiment, the second time-frequency resource comprises S1 the time-frequency resource unit(s), the S1 being a positive integer.

In one embodiment, the second time-frequency resource consists of S1 the time-frequency resource unit(s), the S1 being a positive integer.

In one embodiment, the S1 is equal to 12.

In one embodiment, the S1 is equal to 13.

In one embodiment, at least two the time-frequency resource units comprised in the second time-frequency resource are Time Division Multiplexing (TDM).

In one embodiment, at least two the time-frequency resource units comprised in the second time-frequency resource are Frequency Division Multiplexing (FDM).

In one embodiment, the second target radio signal comprises S2 second-type sub-radio signal(s), any of the S2 second-type sub-radio signal(s) comprises at least one of PSSS, SSSS, SBS or PSBCH-DMRS, the S2 being a positive integer.

In one embodiment, the second time-frequency resource comprises S2 second-type sub-time-frequency resource(s), and the S2 second-type sub-radio signal(s) is(are) respectively transmitted in the S2 second-type sub-time-frequency-resource(s).

In one embodiment, the S2 is equal to 2.

In one embodiment, the S4 is equal to 4.

In one embodiment, at least two of the second-type sub-time-frequency resources comprised in the second time-frequency resource are TDM.

In one embodiment, at least two of the second-type sub-time-frequency resources comprised in the second time-frequency resource are FDM.

In one embodiment, any of the S2 second-type sub-time-frequency resource(s) comprises a positive integer number of the time-frequency resource unit(s).

In one embodiment, at least one of the S2 second-type sub-time-frequency resource(s) comprises 2 the time-frequency resource units.

In one embodiment, at least one of the S2 second-type sub-time-frequency resource(s) comprises 3 the time-frequency resource units.

In one embodiment, at least one of the S2 second-type sub-time-frequency resource(s) comprises 4 the time-frequency resource units.

In one embodiment, at least one of the S2 second-type sub-time-frequency resource(s) comprises 6 the time-frequency resource units.

In one embodiment, the time-frequency-resource units comprised in at least two of the S2 second-type sub-time-frequency resources are different.

In one embodiment, at least two adjacent the time-frequency-resource units comprised in at least one of the S2 second-type sub-time-frequency resource(s) are consecutive in time domain.

In one embodiment, at least two adjacent the time-frequency-resource units comprised in at least one of the S2 second-type sub-time-frequency resource(s) are inconsecutive in time domain.

In one embodiment, at least two adjacent the time-frequency-resource units comprised in at least one of the S2 second-type sub-time-frequency resource(s) are spaced by at least one the time-frequency resource unit in time domain.

In one embodiment, at least two adjacent the time-frequency-resource units comprised in at least one of the S2 second-type sub-time-frequency resource(s) are spaced by at least one the multicarrier symbol in time domain.

In one embodiment, at least two adjacent the time-frequency-resource units comprised in at least one of the S2 second-type sub-time-frequency resource(s) are consecutive in frequency domain.

In one embodiment, at least two adjacent the time-frequency-resource units comprised in at least one of the S2 second-type sub-time-frequency resource(s) are inconsecutive in frequency domain.

In one embodiment, at least two adjacent the time-frequency-resource units comprised in at least one of the S2 second-type sub-time-frequency resource(s) are spaced by at least one the time-frequency resource unit in frequency domain.

In one embodiment, at least two adjacent the time-frequency-resource units comprised in at least one of the S2 second-type sub-time-frequency resource(s) are spaced by at least one subcarrier in frequency domain.

Embodiment 10

Figure 10:
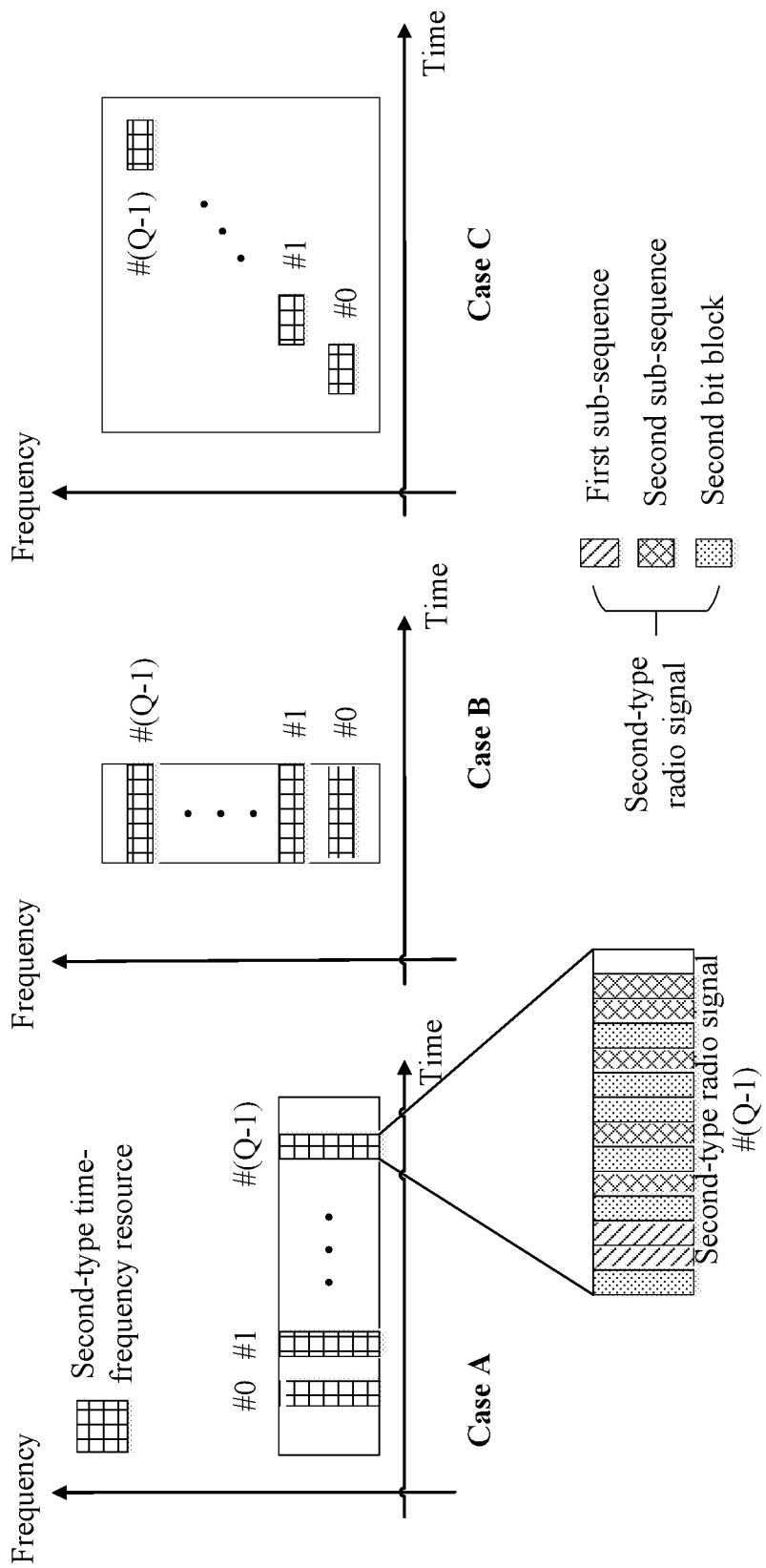
FIG. 10 illustrates a schematic diagram of relationship of Q second-type radio signals according to one embodiment of the present disclosure.

Embodiment 10 illustrates a schematic diagram relationship of Q second-type radio signals according to one embodiment of the present disclosure, as shown in FIG. 10.

In FIG. 10, a solid grid-filled box represents one of Q second-type time-frequency resources; the Q second-type radio signals in the present disclosure are respectively transmitted in the Q second-type time-frequency resources. In FIG. 10, the Q second-type time-frequency resources comprise a second-type time-frequency resource #0, a second-type time-frequency resource #1, . . . , and a second-type time-frequency resource #(Q–1); in case A, the Q second-type time-frequency resources are TDM; in case B, the Q second-type time-frequency resources are FDM; and in case C, the Q second-type time-frequency resources are both TDM and FDM.

In one embodiment, the Q second-type radio signals are respectively transmitted in Q second-type time-frequency resources, and the second time-frequency resource is one of the Q second-type time-frequency resources.

In one embodiment, at least two of the Q second-type time-frequency resources are TDM.

In one embodiment, at least two of the Q second-type time-frequency resources are FDM.

In one embodiment, at least two of the Q second-type time-frequency resources are both TDM and FDM.

In one embodiment, the P first-type radio signal(s) is(are) respectively transmitted in P first-type time-frequency resource(s), and a first time-frequency resource is one of the P first-type time-frequency resource(s).

In one embodiment, at least two of the P first-type time-frequency resources are TDM.

In one embodiment, at least two of the P first-type time-frequency resources are FDM.

In one embodiment, at least two of the P first-type time-frequency resources are both TDM and FDM.

In one embodiment, the first time-frequency resource comprises S3 the time-frequency resource unit(s), the S3 being a positive integer.

In one embodiment, the first time-frequency resource consists of S3 the time-frequency resource unit(s), the S3 being a positive integer.

In one embodiment, at least two the time-frequency resource units comprised in the first time-frequency resource are TDM.

In one embodiment, at least two the time-frequency resource units comprised in the first time-frequency resource are FDM.

Embodiment 11

Figure 11:
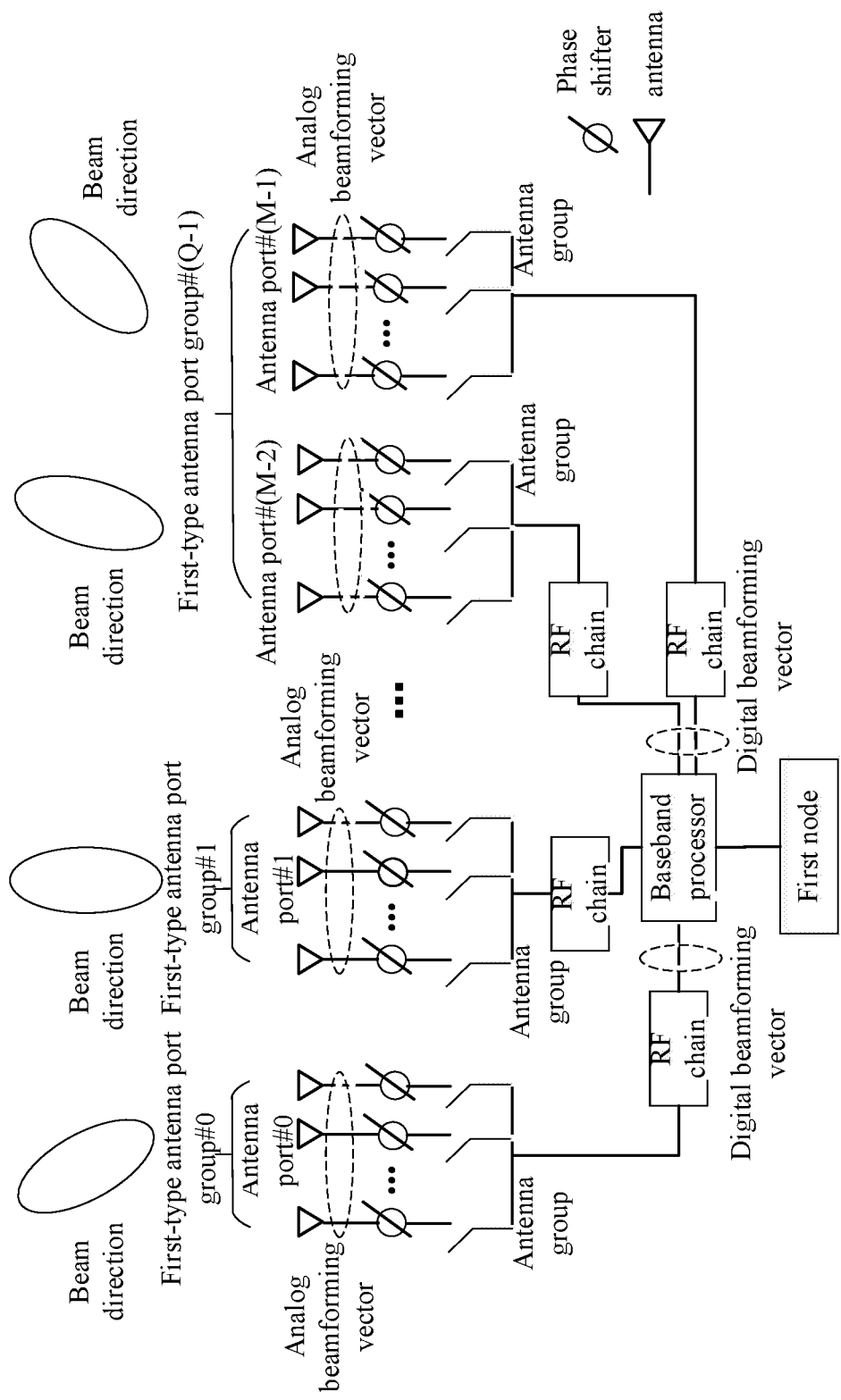
FIG. 11 illustrates a schematic diagram of relationship between antenna port(s) and first-type antenna port group(s) according to one embodiment of the present disclosure.

Embodiment 11 illustrates a schematic diagram of relationship between antenna port(s) and first-type antenna port group(s) according to one embodiment of the present disclosure, as shown in FIG. 11.

In Embodiment 11, a first-type antenna port group comprises a positive integer number of antenna port(s); an antenna port is formed by superimposing antennas in a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. A given antenna port is one of the positive integer number of antenna port(s); mapping coefficients of all antennas in a positive integer number of antenna group(s) comprised by the given antenna port to the given antenna port constitute a beamforming vector corresponding to the given antenna port. Mapping coefficients of multiple antennas comprised in any given antenna group of a positive integer number of antenna group(s) comprised by the given antenna port to the given antenna port constitute an analog beamforming vector of the given antenna group. Analog beamforming vector(s) respectively corresponding to the positive integer number of antenna group(s) comprised by the given antenna port is(are) diagonally arranged to form an analog beamforming matrix corresponding to the given antenna port. Mapping coefficient(s) of the positive integer number of antenna group(s) comprised by the given antenna port to the given antenna port constitutes(constitute) a digital beamforming vector corresponding to the given antenna port. A beamforming vector corresponding to the given antenna port is acquired as a product of the analog beamforming matrix and the digital beamforming vector corresponding to the given antenna port.

In Embodiment 11, the first node in the present disclosure receives P first-type radio signal(s), P being a positive integer; each of the Q pieces of first-type information is related to Spatial Rx parameter(s) of one of the P first-type radio signal(s).

In one embodiment, the Q second-type radio signals are respectively transmitted by Q Spatial Tx Parameters.

In one embodiment, each of the Q Spatial Tx Parameters comprises one or more of a transmission antenna port, a transmission antenna port group, a transmission beam, a transmission analog beamforming matrix, a transmission analog beamforming vector, a transmission beamforming vector, a transmission Spatial filtering and a Spatial domain transmission filter.

In one embodiment, spatial Tx parameters corresponding to at least two of the Q second-type radio signals are different.

In one embodiment, part of spatial Tx parameters used by one of the Q second-type radio signals and part of spatial Tx parameters used by another of the Q second-type radio signals are different.

In one embodiment, part of spatial Tx parameters used by one of the Q second-type radio signals and part of spatial Tx parameters used by another of the Q second-type radio signals are the same.

In one embodiment, at least two of the Q second-type radio signals are non-Quasi Co-Located (QCL).

In one embodiment, the specific meaning of the QCL can be found in TS38.214, section 5.1.5.

In one embodiment, all or part of large-scale properties of one of the Q second-type radio signals cannot be used for inferring that all or part of large-scale properties of another of the Q second-type radio signals.

In one embodiment, the large-scale properties include one or more of delay spread, Doppler spread, Doppler shift, path loss, average gain, average delay, spatial Rx parameters, and spatial Tx parameters.

In one embodiment, QCL parameters of one of the Q second-type radio signals cannot be used for inferring QCL parameters of another of the Q second-type radio signals.

In one embodiment, QCL parameters include one or more of delay spread, Doppler spread, Doppler shift, path loss, average gain, average delay, spatial Rx parameters, and spatial Tx parameters.

In one embodiment, all or part of small-scale channel parameters that one of the Q second-type radio signals goes through cannot be used for inferring all or part of small-scale channel parameters that another of the Q second-type radio signals goes through.

In one embodiment, the small-scale channel parameters comprise one or more of Channel Impulse Response, Precoding Matrix Indicator (PMI), Channel Quality Indicator (CQI) and Rank Indicator (RI).

In one embodiment, the Q second-type radio signals are respectively transmitted on Q first-type antenna port groups.

In one embodiment, the second target radio signal is transmitted on a first antenna port group, and the first antenna port group is one of the Q first-type antenna port groups.

In one embodiment, each of the Q first-type antenna port groups comprises a positive integer number of antenna port(s).

In one embodiment, each of the Q first-type antenna port groups only comprises one antenna port.

In one embodiment, a number of antenna ports comprised in at least two of the Q first-type antenna port groups are different.

In one embodiment, one of the positive integer number of antenna port(s) is formed by superposition of antennas of a positive integer number of antenna group(s) through antenna virtualization;

In one embodiment, one of the positive integer number of antenna group(s) comprises a positive integer number of antenna(s).

In one embodiment, one of the positive integer number of antenna groups is connected to a baseband processor via a radio frequency (RF) chain, and different antenna groups in the positive integer number of antenna groups correspond to different RF chains.

In one embodiment, mapping coefficients from all antennas of a positive integer number of antenna group(s) comprised in a given antenna port to the given antenna port constitute a beamforming vector corresponding to the given antenna port.

In one embodiment, mapping coefficients from a positive integer number of antenna(s) comprised in any given antenna group within a positive integer number of antenna group(s) comprised in the given antenna port to the given antenna port constitute an analog beamforming vector of the given antenna group.

In one embodiment, analog beamforming vector(s) corresponding to a positive integer number of antenna group(s) comprised in the given antenna port are diagonally arranged to form an analog beamforming matrix corresponding to the given antenna port.

In one embodiment, mapping coefficients from the positive integer number of antenna group(s) comprised in the given antenna port to the given antenna port constitute a digital beamforming vector corresponding to the given antenna port.

In one embodiment, a beamforming vector corresponding to the given antenna port is acquired as a product of the analog beamforming matrix and the digital beamforming vector corresponding to the given antenna port.

In one embodiment, different antenna ports comprised in the one first-type antenna port group consist of a same antenna group.

In one embodiment, different antenna ports comprised in the one first-type antenna port group correspond to different beamforming vectors.

In one embodiment, the one first-type antenna port group only comprises the one antenna group, that is, an RF chain.

In one subembodiment of the above embodiment, an analog beamforming matrix corresponding to an antenna port comprised in the one first-type antenna port is subjected to dimensionality reduction to form an analog beamforming vector.

In one subembodiment of the above embodiment, a digital beamforming matrix corresponding to an antenna port comprised in the one first-type antenna port is subjected to dimensionality reduction to form a scaler.

In one subembodiment of the above embodiment, a beamforming vector corresponding to an antenna port comprised in the first-type antenna port is equal to an analog beamforming vector corresponding to an antenna port comprised in the one first-type antenna port.

In one embodiment, the one first-type antenna port group comprises an antenna port.

In one embodiment, the one first-type antenna port group comprises a positive integer number of antenna group(s), that is, multiple RF chains.

In one embodiment, the one first-type antenna port group comprises a positive integer number of antenna port(s).

In one embodiment, different antenna ports comprised in the one first-type antenna port group correspond to a same analog beamforming matrix.

In one embodiment, different antenna ports comprised in the one first-type antenna port group correspond to different digital beamforming vectors.

In one embodiment, antenna ports comprised in at least two first-type antenna port groups comprised in the Q first-type antenna port group correspond to different analog beamforming matrices.

In one embodiment, the one antenna port is one antenna port.

In one embodiment, the small-scale channel parameters that a radio signal transmitted from the one antenna port goes through can b e used for inferring the small-scale channel parameters that another radio signal transmitted from the one antenna port goes through.

In one embodiment, any two antenna ports comprised in the one first-type antenna port group are QCL.

In one embodiment, two antenna ports being QCL refers to that all or part of the large-scale properties of a radio signal transmitted by the one of the two antenna ports can be used for inferring all or part of the large-scale properties of a radio signal transmitted by the other of the two antenna ports.

In one embodiment, the P first-type radio signal(s) respectively uses(use) P Spatial Tx Parameter(s) for a reception (receptions).

In one embodiment, each of the P Spatial Rx Parameter(s) comprises a reception beam, a reception analog beamforming matrix, a reception analog beamforming vector, a reception beamforming vector, a reception Spatial filter, and a Spatial domain reception filter.

In one embodiment, at least two of the P first-type radio signals are not QCL.

In one embodiment, all or part of large-scale properties of one of the P first-type radio signals cannot be used for inferring all or part of large-scale properties of another of the P first-type radio signals.

In one embodiment, QCL parameters of one of the P first-type radio signal(s) cannot be used for inferring QCL parameters of another of the P first-type radio signal(s).

In one embodiment, all or part of small-scale channel parameters that one of the Q second-type radio signals goes through cannot be used for inferring all or part of small-scale channel parameters that another of the Q second-type radio signals goes through.

In one embodiment, the first information is used for indicating whether the one spatial Tx parameter corresponding to the second target radio signal is related to at least one of the P first-type radio signal(s).

In one embodiment, the first information is used for indicating whether the one spatial Tx parameter corresponding to the second target radio signal is related to the one spatial Rx parameter corresponding to at least one of the P first-type radio signal(s).

In one embodiment, the one spatial Tx parameter being related to the one spatial Rx parameter refers to that a transmission beam comprised in the one spatial Tx parameter is opposite to a reception beam comprised in the one spatial Rx parameter.

In one embodiment, the one spatial Tx parameter being related to the one spatial Rx parameter refers to that a transmission analog beamforming matrix comprised in the one spatial Tx parameter and a reception analog beamforming matrix comprised in the one spatial Rx parameter are the same.

In one embodiment, the one spatial Tx parameter being related to the one spatial Rx parameter refers to that a transmission analog beamforming matrix comprised in the one spatial Tx parameter is an inverse-matrix of a reception analog beamforming matrix of the one spatial Rx parameter.

In one embodiment, the one spatial Tx parameter being related to the one spatial Rx parameter refers to that a transmission analog beamforming vector comprised in the one spatial Tx parameter and a reception analog beamforming vector comprised in the one spatial Rx parameter are the same.

In one embodiment, the one spatial Tx parameter being related to the one spatial Rx parameter refers to that a transmission analog beamforming vector comprised in the one spatial Tx parameter is an inverse-vector of a reception analog beamforming vector comprised in the one spatial Rx parameter.

In one embodiment, the one spatial Tx parameter being related to the one spatial Rx parameter refers to that a transmission spatial filter comprised in the one spatial Tx parameter is the same with a reception spatial filter comprised in the one spatial Rx parameter.

In one embodiment, the first information is used for indicating that the first antenna port group corresponding to the second target radio signal is related to at least one of the P first-type radio signal(s).

In one embodiment, the first information is used for indicating whether the first antenna port group is associated with at least one of the P first-type radio signal(s).

In one embodiment, the first information is used for indicating whether the first antenna port group is associated with the one spatial Rx parameter corresponding to at least one of the P first-type radio signal(s).

In one embodiment, the first information is used for indicating whether the second time-frequency resource is related to at least one of the P first-type radio signal(s).

In one embodiment, the first information is used for indicating whether the second time-frequency resource is associated with the one first-type time-frequency resource occupied by at least one of the P first-type radio signal(s).

In one embodiment, when a radio signal transmitted by the second time-frequency resource uses a spatial Tx parameter related to at least one of the P spatial Rx parameter(s), the one spatial Rx parameter is used for receiving a first target radio signal, the first target radio signal is one of the P first-type radio signal(s), and the second time-frequency resource is associated with the first target radio signal.

In one subembodiment of the above embodiment, the first target radio signal is transmitted on one of the P first-type time-frequency resource(s), and the second time-frequency resource is associated with the one first-type time-frequency resource.

In one embodiment, each of the Q pieces of first-type information indicates whether a corresponding first-type antenna port group is associated with at least one of the P first-type radio signal(s).

In one embodiment, a first antenna port is any of the Q first-type antenna port groups.

In one embodiment, when the first antenna port group is associated with at least one of the P first-type radio signal(s), first-type information of the Q pieces of first-type information transmitted by the first antenna port group indicates an identifier of a transmitter of the P first-type radio signal(s).

In one embodiment, when the first antenna port group is not associated with at least one of the P first-type radio signal(s), first-type information of the Q pieces of first-type information transmitted by the first antenna port group is configured to be a default value.

In one embodiment, the identifier of the transmitter of the P first-type radio signal(s) is a non-negative integer.

In one embodiment, the identifier of the transmitter of the P first-type radio signal(s) is a Physical Cell Identifier (PCI).

In one embodiment, the identifier of the transmitter of the P first-type radio signal(s) is an integer no less than 0 and no greater than 1007.

In one embodiment, the default value is fixed (that is, non-configured).

In one embodiment, the default value is configured.

In one embodiment, the first node uses P spatial Rx parameter(s) for respectively receiving the P first-type radio signal(s); when at least one antenna port of the first antenna port group is associated with at least one of the P spatial Rx parameter(s), the first antenna port group is associated with at least one of the P first-type radio signal(s); otherwise the first antenna port group is not associated with any of the P first-type radio signal(s).

In one embodiment, the first node uses P spatial Rx parameter(s) for respectively receiving the P first-type radio signal(s); when any antenna port of the first antenna port group is not associated with any of the P spatial Rx parameter(s), the first antenna port group is not associated with at least one of the P first-type radio signal(s); otherwise the first antenna port group is associated with at least one of the P first-type radio signal(s).

In one embodiment, the first node uses P spatial Rx parameter(s) for respectively receiving the P first-type radio signal(s); when each of antenna port of the first antenna port group is associated with at least one of the P spatial Rx parameter(s), the first antenna port group is associated with at least one of the P first-type radio signal(s); otherwise the first antenna port group is not associated with any of the P first-type radio signal(s).

In one embodiment, when a transmission beam corresponding to a generation of an antenna port is spatially-related to a reception beam corresponding to a spatial Rx parameter, the one antenna port is associated with the one spatial Rx parameter; otherwise the one antenna port is not associated with the one spatial Rx parameter.

In one embodiment, when a beamforming vector for generating an antenna port is the same with a beamforming vector comprised in one spatial Rx parameter, the one antenna port is associated with the one spatial Rx parameter; otherwise the one antenna port is not associated with the one spatial Rx parameter.

In one embodiment, when a correlation between a beamforming vector for generating one antenna port and a beamforming vector comprised in one spatial Rx parameter is greater than a specific threshold, the one antenna port is associated with the one spatial Rx parameter; otherwise the one antenna port is not associated with the one spatial Rx parameter; the specific threshold is greater than 0 and no greater than 1.

In one embodiment, a first vector is used for generating an antenna port, and a second vector is used for generating a spatial Rx parameter; if one second vector is used for generating another antenna port, and the one antenna port is spatially-related to the another antenna port, the one antenna port is associated with the one spatial Rx parameter, otherwise the one antenna port is not associated with the one spatial Rx parameter.

In one embodiment, when large-scale properties that the one antenna port goes through can be used for inferring large-scale properties that the another antenna port goes through, the one antenna port and the another antenna port are spatially-related.

In one embodiment, when spatial Rx parameters corresponding to the one antenna port can be used for receiving the another antenna port, the one antenna port and the another antenna port are spatially-related.

In one embodiment, when reception beamforming vector corresponding to the one antenna port can be used for receiving the another antenna port, the one antenna port and the another antenna port are spatially-related.

In one embodiment, when spatial reception filter corresponding to the one antenna port can be used for receiving the another antenna port, the one antenna port and the another antenna port are spatially-related.

In one embodiment, the large-scale properties comprise a maximum multipath delay.

In one embodiment, the large-scale properties comprise a maximum doppler frequency offset.

In one embodiment, the beamforming vector comprises a vector for generating an analog beam.

In one embodiment, the beamforming vector comprises a vector for generating a digital beam.

Embodiment 12

Figure 12:
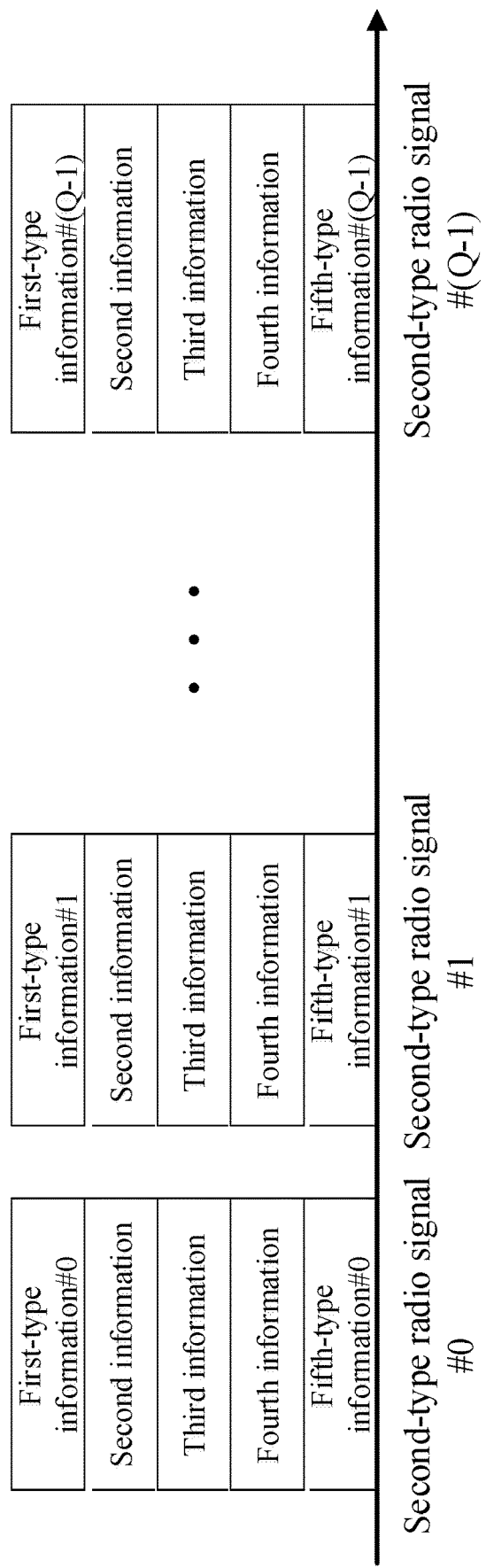
FIG. 12 illustrates a schematic diagram of relationship among first-type information, second information and a second-type radio signal according to one embodiment of the present disclosure.

Embodiment 12 illustrates a schematic diagram of relation among first-type information, second information and a second-type radio signal according to one embodiment of the present disclosure, as shown in FIG. 12.

In Embodiment 12, each of the Q second-type radio signals comprises a second information, the second information being used for indicating whether the first node is in coverage.

In one embodiment, second information comprised in any two of the Q second-type radio signals is the same.

In one embodiment, the second information comprises one of TRUE or FALSE.

In one embodiment, when the second information is TRUE, it is used for indicating that the first node is in coverage.

In one embodiment, when the second information is FALSE, it is used for indicating that the first node is out of coverage.

In one embodiment, the second information comprises one of In-Cell-coverage, In-GNSS-Coverage, or Out-of-Coverage.

In one embodiment, the second information is used for generating the second target radio signal.

In one embodiment, the second information is used for scrambling the second target radio signal.

In one embodiment, the second information is used for generating the second sequence.

In one embodiment, the second information is used for generating the second bit block.

In one embodiment, the second bit block comprises the second information.

In one embodiment, each of the Q second-type radio signals comprises a third information, the third information is used for indicating the transmitter of the P first-type radio signal(s).

In one embodiment, third information comprised in any two of the Q second-type radio signals is the same.

In one embodiment, the third information comprises a Global Navigation Satellite System (GNSS).

In one embodiment, the third information comprises a cell.

In one embodiment, the third information comprises a serving cell.

In one embodiment, the third information comprises a primary cell.

In one embodiment, the third information comprises a Secondary Cell (SCell).

In one embodiment, the third information comprises a Neighboring Cell.

In one embodiment, the third information comprises a base station.

In one embodiment, the third information comprises an E-UTRAN base station.

In one embodiment, the third information comprises an NR base station.

In one embodiment, the third information comprises a UE.

In one embodiment, the third information comprises a SyncRefUE.

In one subembodiment of the above embodiment, the SyncRefUE refers to that a UE is configured for the synchronization reference.

In one embodiment, the third information comprises an In-Coverage SyncRefUE.

In one embodiment, the third information comprises an Out-of-Coverage SyncRefUE.

In one embodiment, the third information comprises one of the P first-type radio signal(s).

In one embodiment, the third information comprises a Synchronization Reference Beam (SyncRefBeam).

In one subembodiment of the above embodiment, the SyncRefBeam is one of the P first-type radio signal(s), and the one spatial Rx parameter is used for the one first-type radio signal.

In one subembodiment of the above embodiment, the one spatial Rx parameter is configured for the synchronization reference.

In one embodiment, the third information comprises a Synchronization Reference Resource (SyncRefResource), the SyncRefResource is a signal transmitted on one of the P first-type time-frequency resource(s).

In one subembodiment of the above embodiment, the SyncRefResource refers to that a first-type time frequency resource is configured for the synchronization reference.

In one embodiment, P first-type SyncRefResource(s) respectively comprises(comprise) the P first-type time-frequency resource(s), and the third information comprises a first-type SyncRefResource in the P first-type SyncRefResource(s).

In one embodiment, P first-type SyncRefResource(s) respectively belongs(belong) to the P first-type time-frequency resource(s), and the third information comprises a first-type SyncRefResource in the P first-type SyncRefResource(s).

In one subembodiment of the above embodiment, the P first-type radio signal(s) is(are) respectively transmitted in the P first-type SyncRefResource(s).

In one embodiment, the third information is used for determining an SLSSID of the second target radio signal.

In one embodiment, when the third information is used for indicating a GNSS, an SLSSID the second target radio signal is equal to a first specific value.

In one embodiment, the first specific value is 0.

In one embodiment, when the third information is used for indicating a SyncRefUE, and when (an) SLSSID(s) of the P first-type radio signal(s) is(are) equal to (a) first specific value(s), an SLSSID of the second target radio signal is equal to a first specific value.

In one embodiment, J1 first-type identifier(s) is(are) used for generating J1 first-type PSSS(s) and J1 first-type SSSS(s), the J1 being a positive integer.

In one embodiment, any of the J1 first-type identifier(s) is a non-negative integer.

In one embodiment, any two of the J1 first-type PSSSs are the same, and any two of the J1 first-type SSSSs are different.

In one embodiment, when the third information indicates an In-Coverage SyncRefUE, an SLSSID of the second target radio signal is equal to one of the J1 first-type identifier(s).

In one embodiment, the first-type identifier is a non-negative integer from 0 to 167.

In one embodiment, J2 second-type identifier(s) is(are) respectively used for generating J2 second-type PSSS(s) and J2 second-type SSSS(s), the J2 being a positive integer.

In one embodiment, any of the J2 second-type identifier(s) is a non-negative integer.

In one embodiment, any two of the J2 second-type PSSSs are the same, and any two of the J2 second-type SSSSs are different.

In one embodiment, any of the J1 first-type PSSS(s) and any of the J2 second-type PSSS(s) are different.

In one embodiment, any of the J1 first-type identifier(s) and any of the J2 second-type identifier(s) are different.

In one embodiment, when the third information indicates an Out-of-Coverage SyncRefUE, an SLSSID of the second target radio signal is equal to one of the J2 second-type identifier(s).

In one embodiment, the third information is used for generating the second target radio signal.

In one embodiment, the third information is used for scrambling the second target radio signal.

In one embodiment, the third information is used for generating the second sequence.

In one embodiment, the third information is used for generating the second bit block.

In one embodiment, the second bit block comprises the third information.

In one embodiment, each of the Q second-type radio signals comprises fourth information, and the fourth information is used for indicating a System Frame Number (SFN) transmitted by the Q second-type radio signals.

In one embodiment, each of the Q second-type radio signals comprises fourth information, and the fourth information is used for indicating a Direct Frame Number (DFN) for transmitting the Q second-type radio signals.

In one embodiment, each of the Q second-type radio signals comprises fourth information, the fourth information being used for indicating a Half Frame Index transmitted by the Q second-type radio signals, and the Half Frame Index comprises one of a First Half and a Second Half.

In one embodiment, each of the Q second-type radio signals comprises fourth information, the fourth information being used for indicating a direct subframe number of a sidelink subframe where the Q second-type radio signals are transmitted in sidelink frame where the Q second-type radio signals are transmitted.

In one embodiment, each of the Q second-type radio signals comprises fourth information, the fourth information being used for indicating one or two of a sidelink transmission bandwidth, and a Time Division Duplex (TDD) configuration.

In one embodiment, each of the Q second-type radio signals comprises fourth information, the fourth information being used for indicating an SCS transmitted by the Q second-type radio signals.

In one embodiment, each of the Q second-type radio signals comprises fourth information, the fourth information being used for indicating a frequency offset between frequency locations of the Q second-type radio signals and the whole system time-frequency-resource-block grid, and the frequency offset comprises an integer number of subcarrier(s).

In one embodiment, each of the Q second-type radio signals comprises fourth information, the fourth information being used for indicating a frequency offset between a frequency location of a sidelink and the whole system time-frequency-resource-block grid, and the frequency offset comprises an integer number of subcarrier(s).

In one embodiment, the fourth information is the Q second-type-radio-signal-common.

In one embodiment, fourth information comprised in any two of the Q second-type radio signals is the same.

In one embodiment, the fourth information is used for generating the second target radio signal.

In one embodiment, the fourth information is used for scrambling the second target radio signal.

In one embodiment, the fourth information is used for generating the second sequence.

In one embodiment, the fourth information is used for generating the second bit block.

In one embodiment, the second bit block comprises the fourth information.

In one embodiment, the Q second-type radio signals respectively comprise Q pieces of fifth-type information, a second target radio signal is one of the Q second-type radio signals, fifth information is one of the Q pieces of fifth information, and the second target radio signal comprises the fifth information.

In one embodiment, the fifth information is used for indicating an index of the second target radio signal in the Q second-type radio signals.

In one embodiment, an index of the second target radio signal in the Q second-type radio signals is a non-negative integer less than the Q.

In one embodiment, an index of the second target radio signal in the Q second-type radio signals is one of {#0, #1, . . . , #(Q−1)}.

In one embodiment, fifth information comprised in any two of the Q second-type radio signals is the same.

In one embodiment, the fifth information is used for indicating a time-frequency resource position of the second target radio signal.

In one embodiment, the fifth information is used for generating the second target radio signal.

In one embodiment, the fifth information is used for scrambling the second target radio signal.

In one embodiment, the fifth information is used for generating the second sequence.

In one embodiment, the fifth information is used for generating the second bit block.

In one embodiment, the second bit block comprises the fifth information.

Embodiment 13

Figure 13:
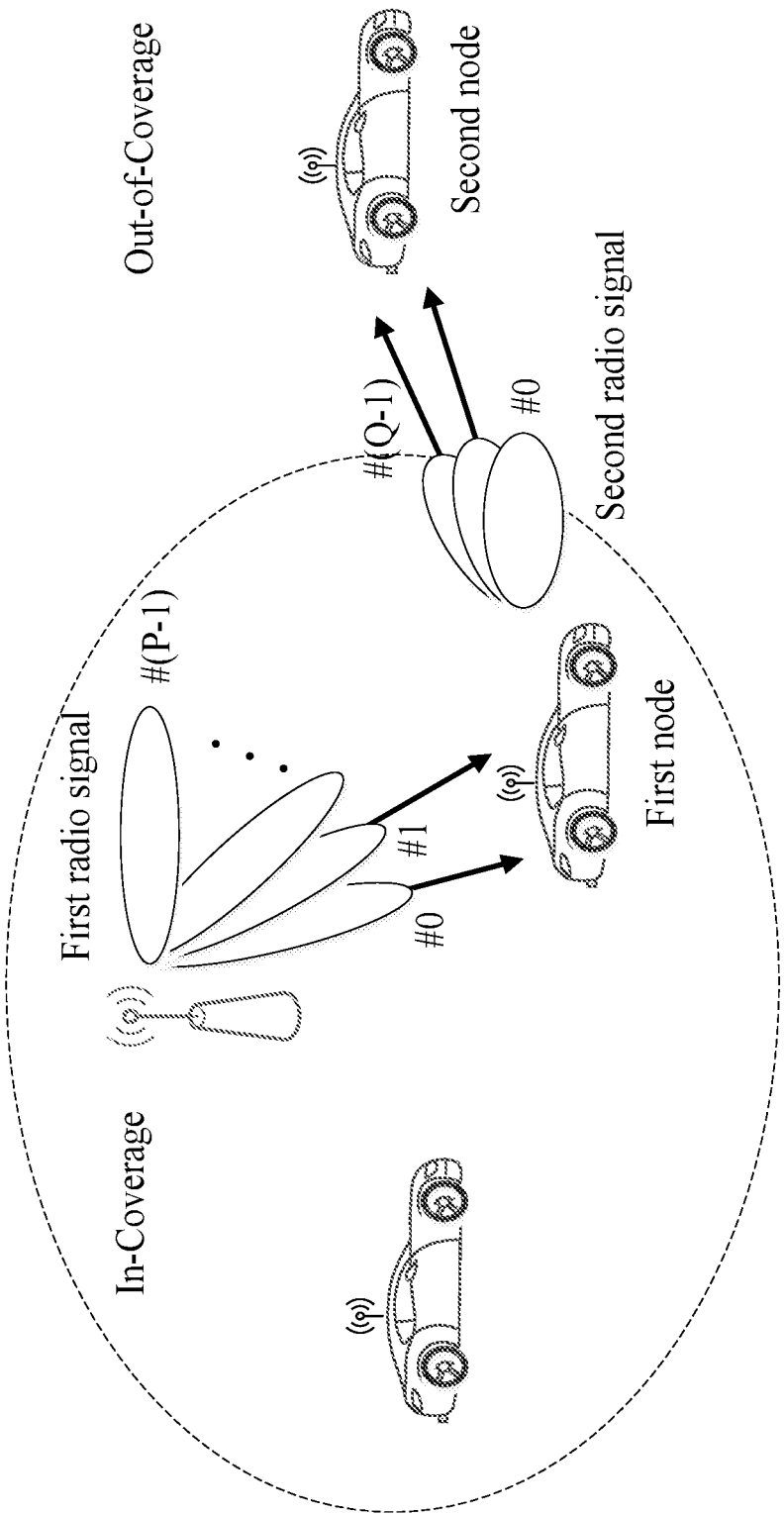
FIG. 13 illustrates a schematic diagram of relationship between positions of a first node and a second node according to one embodiment of the present disclosure.

Embodiment 13 illustrates a schematic diagram of relationship between positions of a first node and a second node according to one embodiment of the present disclosure, as shown in FIG. 13.

In FIG. 13, the inside of the dot-framed ellipse represents being In-Coverage, and the outside of the dot-framed ellipse represents being Out-of-Coverage.

In Embodiment 13, the first node in the present disclosure receives a target-specific signal, and judges whether the first node is in coverage according to a target received quality of the target-specific signal.

In Embodiment 13, the first node in the present disclosure is In-coverage, and the second node in the present disclosure is Out-of-Coverage.

In one embodiment, when a target received quality of a target-specific signal received by the first node is no less than a target threshold, the first node is In-Coverage.

In one embodiment, when a target received quality of a target-specific signal received by the first node is less than a target threshold, the first node is Out-of-Coverage.

In one embodiment, the target-specific radio comprises a Synchronization Signal (SS).

In one embodiment, the target-specific radio comprises a Primary Synchronization Signal (PSS).

In one embodiment, the target-specific radio comprises a Secondary Synchronization Signal (SSS).

In one embodiment, the target-specific radio comprises a Physical Broadcast Signal.

In one embodiment, the target-specific radio comprises a Physical Broadcast Channel (PBCH).

In one embodiment, the target-specific radio comprises a PBCH Demodulation Reference Signal (PBCH-DMRS).

In one embodiment, the target-specific radio comprises a SS/PBCH block (SSB).

In one embodiment, the target-specific radio comprises a Reference Signal (RS).

In one embodiment, the target-specific radio comprises a Discovery Reference Signal (DRS).

In one embodiment, the target-specific radio comprises a signal transmitted on a Physical Downlink Control Channel (PDCCH).

In one embodiment, the target-specific radio comprises a signal transmitted on a Physical Downlink Control Channel (PDSCH).

In one embodiment, the target received quality comprises a Reference Signal Received Power (RSRP).

In one embodiment, the target received quality comprises Sidelink Reference Signal Received Power (S-RSRP).

In one embodiment, the target received quality comprises a Received (linear) average power of the resource elements that carry E-UTRA synchronization signal, measured at the UE antenna connector (SCH_RP).

In one embodiment, the target received quality comprises Reference Signal Received Quality (RSRQ).

In one embodiment, the target received quality comprises a Reference Signal Strength Indicator (RSSI).

In one embodiment, the target received quality comprises a Signal to Noise Ratio (SNR).

In one embodiment, the target received quality comprises a Signal to Interference plus Noise Ratio (SINR).

In one embodiment, the target received quality comprises a Block Error Rate (BLER).

In one embodiment, the target received quality comprises a Bit Error Rate (BER).

In one embodiment, the target received quality comprises a Packet Error Rate (PER).

In one embodiment, the target threshold is measured by dB.

In one embodiment, the target threshold is measured by dBm.

In one embodiment, the target threshold is measured by W.

In one embodiment, the target threshold is measured by mW.

In one embodiment, the target threshold is predefined, that is, no signaling configuration is required.

In one embodiment, the target threshold is configured by a higher-layer signaling.

In one embodiment, the target threshold is configured by system information.

In one embodiment, the target threshold is configured by an SIB.

In one embodiment, the target threshold is configured by an RRC-layer signaling.

In one embodiment, the target threshold is configured by a MAC-layer signaling.

In one embodiment, the target threshold is configured by a PHY-layer signaling.

In one embodiment, each of the Q second-type radio signals comprises a second information, the second information being used for indicating whether the first node is In-Cell-Coverage.

In one embodiment, when first received quality of a first specific signal of at least one serving cell received by the first node is greater than a first threshold, the first node is In-Cell-Coverage.

In one embodiment, the first specific radio comprises a Synchronization Signal (SS).

In one embodiment, the first specific radio comprises a Primary Synchronization Signal (PSS).

In one embodiment, the first specific radio comprises a Secondary Synchronization Signal (SSS).

In one embodiment, the first specific radio comprises a Physical Broadcast Signal.

In one embodiment, the first specific radio comprises a Physical Broadcast Channel (PBCH).

In one embodiment, the first specific radio comprises a PBCH Demodulation Reference Signal (PBCH-DMRS).

In one embodiment, the first specific radio comprises an SS/PBCH block (SSB).

In one embodiment, the first specific radio comprises a Reference Signal (RS).

In one embodiment, the first specific radio comprises a Discovery Reference Signal (DRS).

In one embodiment, the first specific radio comprises a signal transmitted on a Physical Downlink Control Channel (PDCCH).

In one embodiment, the first specific radio comprises a signal transmitted on a Physical Downlink Control Channel (PDSCH).

In one embodiment, the first received quality comprises a Reference Signal Received Power (RSRP).

In one embodiment, the first received quality comprises a Received (linear) average power of the resource elements that carry E-UTRA synchronization signal, measured at the UE antenna connector (SCH_RP).

In one embodiment, the first received quality comprises a Reference Signal Received Quality (RSRQ).

In one embodiment, the first received quality comprises a Reference Signal Strength Indicator (RSSI).

In one embodiment, the first received quality comprises a Signal to Noise Ratio (SNR).

In one embodiment, the first received quality comprises a Signal to Interference plus Noise Ratio (SINR).

In one embodiment, the first received quality comprises a Block Error Rate (BLER).

In one embodiment, the first received quality comprises a Bit Error Rate (BER).

In one embodiment, the first received quality comprises a Packet Error Rate (PER).

In one embodiment, the first threshold is measured by dBm.

In one embodiment, the first threshold is measured by mW.

In one embodiment, the first threshold is predefined, that is, no signaling configuration is required.

In one embodiment, the first threshold is configured by a higher-layer signaling.

In one embodiment, the first threshold is configured by system information.

In one embodiment, the first threshold is configured by an SIB.

In one embodiment, the first threshold is configured by an RRC-layer signaling.

In one embodiment, the first threshold is configured by a MAC-layer signaling.

In one embodiment, the first threshold is configured by a PHY-layer signaling.

In one embodiment, each of the Q second-type radio signals comprises a second information, the second information being used for indicating whether the first node is In-GNSS-Coverage.

In one embodiment, the GNSS included one or more of Global Positioning System (GPS), Galileo, Compass, GLONASS, Indian Regional Navigation Satellite System (IRNSS), and Quasi-Zenith Satellite System (QZSS).

In one embodiment, when second received quality of a second specific signal of GNSS received by the first node is greater than a second threshold, the first node is In-GNSS-Coverage.

In one embodiment, the second specific radio comprises an SS.

In one embodiment, the second specific radio comprises a PSS.

In one embodiment, the second specific radio comprises an SSS.

In one embodiment, the second specific radio comprises a Physical Broadcast Signal.

In one embodiment, the second specific radio comprises a PBCH.

In one embodiment, the second specific radio comprises a PBCH-DMRS.

In one embodiment, the second specific radio comprises a SS/PBCH block (SSB).

In one embodiment, the second specific radio comprises a RS.

In one embodiment, the second specific radio comprises a DRS.

In one embodiment, the second specific radio comprises a signal transmitted on a PDCCH.

In one embodiment, the second specific radio comprises a signal transmitted on a PDSCH.

In one embodiment, the second received quality comprises a RSRP.

In one embodiment, the second received quality comprises a Received (linear) average power of the resource elements that carry E-UTRA synchronization signal, measured at the UE antenna connector (SCH_RP).

In one embodiment, the second received quality comprises RSRQ.

In one embodiment, the second received quality comprises a RSSI.

In one embodiment, the second received quality comprises a SNR.

In one embodiment, the second received quality comprises a SINR.

In one embodiment, the second received quality comprises a BLER.

In one embodiment, the second received quality comprises a BER.

In one embodiment, the second received quality comprises a PER.

In one embodiment, the second threshold is measured by dBm.

In one embodiment, the second threshold is measured by mW.

In one embodiment, the second threshold is predefined, that is, no signaling configuration is requires.

In one embodiment, the second threshold is configured by a higher-layer signaling.

In one embodiment, the second threshold is configured by system information.

In one embodiment, the second threshold is configured by an SIB.

In one embodiment, the second threshold is configured by an RRC-layer signaling.

In one embodiment, the second threshold is configured by a MAC-layer signaling.

In one embodiment, the second threshold is configured by a PHY-layer signaling.

In one embodiment, when the first node does not detect that first received quality of a first specific radio of a serving cell is greater than a first threshold, the first node is out of cell coverage.

In one embodiment, when the first node does not detect that second received quality of a second specific signal of a GNSS is greater than a second threshold, the first node is out of GNSS coverage.

In one embodiment, when the first node does not detect that first received quality of a first specific radio of a serving cell is greater than a first threshold, or, when the first node does not detect that second received quality of a second specific signal of a GNSS is greater than a second threshold, the first node is out of coverage.

In one embodiment, when the first node does not detect that first received quality of a first specific radio of a serving cell is greater than a first threshold, and, when the first node does not detect that second received quality of a second specific signal of a GNSS is greater than a second threshold, the first node is out of coverage.

Embodiment 14

Figure 14:
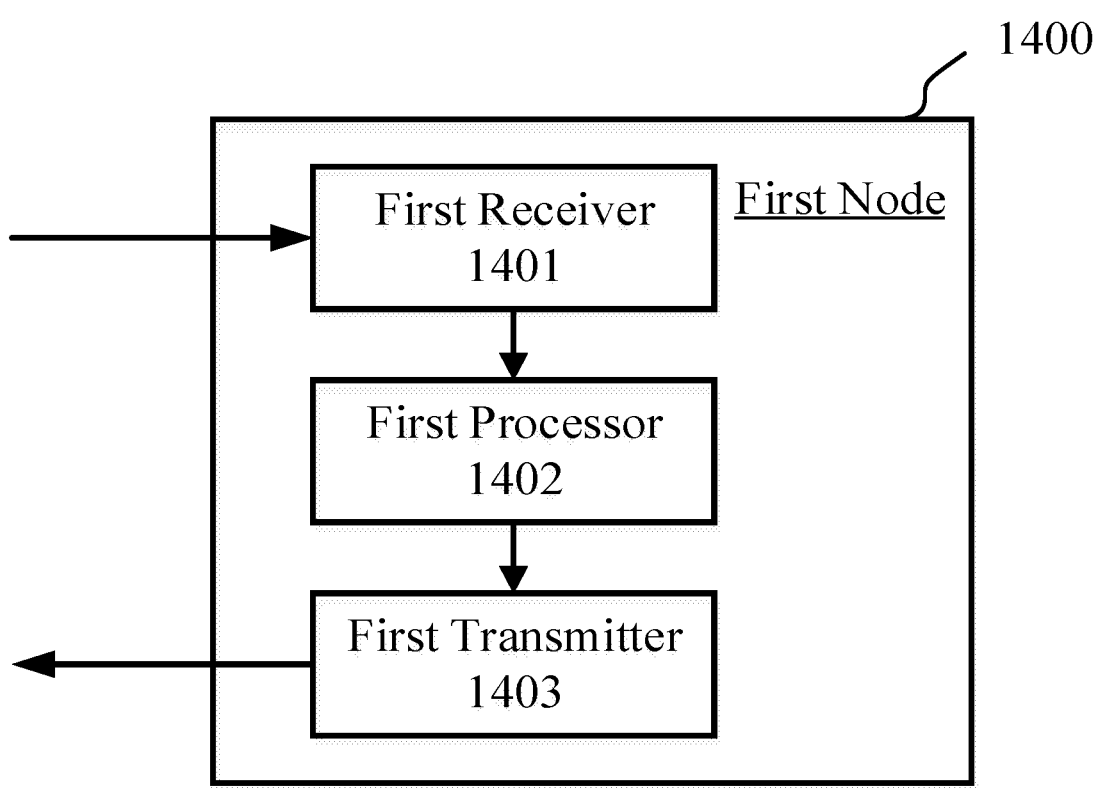
FIG. 14 illustrates a structure block diagram of a processing device in a first node according to one embodiment of the present disclosure.

Embodiment 14 illustrates a structure block diagram of a processing device used in a first node, as shown in FIG. 14.

In FIG. 14, the first node processing device 1400 mainly consists of a first receiver 1401, a first processor 1402 and a first transmitter 1403.

In one embodiment, the first receiver 1401 comprises at least one of an antenna 452, a transmitter/receiver 454, a multi-antenna receiving processor 458, a receiving processor 456, a controller/processor 459, a memory 460 or a data source 467 in FIG. 4 of the present disclosure.

In one embodiment, a first processor 1402 comprises at least one of a controller/processor 459, a memory and a data source 467 in FIG. 4 in the present disclosure.

In one embodiment, the first transmitter 1403 comprises at least one of an antenna 452, a transmitter/receiver 454, a multi-antenna transmitting processor 457, a transmitting processor 468, a controller/processor 459, a memory 460, or a data source 467 in FIG. 4 of the present disclosure.

In Embodiment 14, the first processor 1402 judges whether the first node is in coverage; the first transmitter 1403 transmits Q second-type radio signals; herein, the Q second-type radio signals respectively comprise Q pieces of first-type information; whether each of the Q second-type radio signals can be selected as a synchronization reference is related to its comprised first-type information; the Q pieces of first-type information are independently generated, Q being a positive integer greater than 1.

In Embodiment 14, the first processor 1402 judges whether the first node is in coverage; the first transmitter 1403 transmits Q second-type radio signals; herein, the Q second-type radio signals respectively comprise Q pieces of first-type information; whether each of the Q second-type radio signals can be selected as a synchronization reference is related to its comprised first-type information; whether the Q pieces of first-type information are independently generated is related to whether the first node is in coverage, Q being a positive integer greater than 1.

In one embodiment, the first receiver 1401 receives P first-type radio signal(s), P being a positive integer; herein, each of the Q pieces of first-type information is related to Spatial Rx parameter(s) of one of the P first-type radio signal(s).

In one embodiment, each of the Q second-type radio signals comprises a second information, the second information being used for indicating whether the first node is in coverage.

In one embodiment, the first receiver 1401 receives a target-specific signal, and judges whether the first node is in coverage according to target received quality of the target-specific signal.

In one embodiment, when first node is in coverage, the Q pieces of first-type information are independently generated.

In one embodiment, when the first node is out of coverage, the Q first-type information are not independently generated.

In one embodiment, the first node is a UE.

In one embodiment, the first node is a relay node.

Embodiment 15

Figure 15:
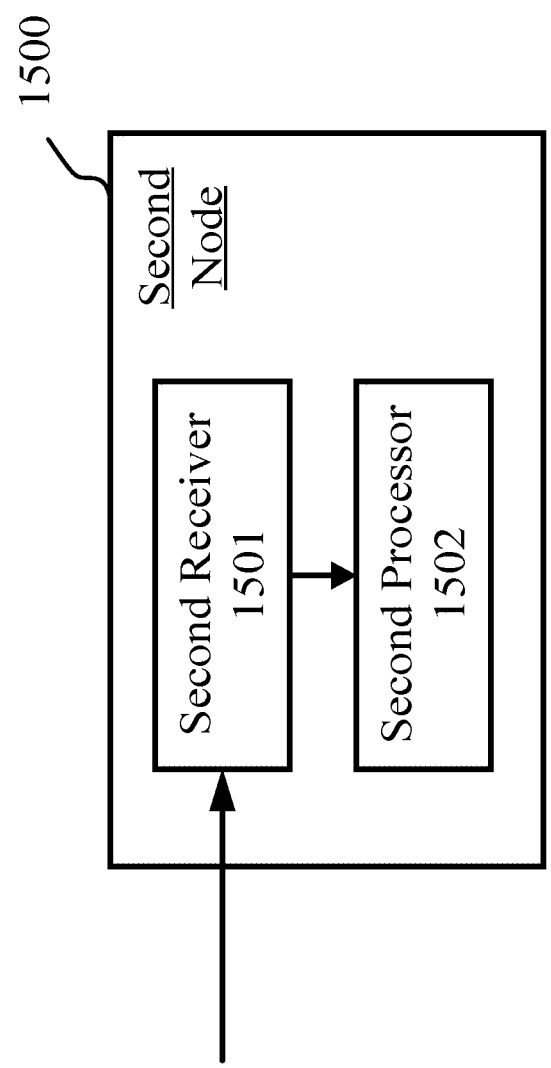
FIG. 15 illustrates a structure block diagram of a processing device in a second node according to one embodiment of the present disclosure.

Embodiment 15 illustrates a structure block diagram of a processing device in a second node, as shown in FIG. 15. In FIG. 15, the second node processing device 1500 mainly consists of a second receiver 1501 and a second processor 1502.

In one embodiment, the second receiver 1501 comprises at least one of an antenna 420, a transmitter/receiver 418, a multi-antenna receiving processor 472, a receiving processor 470, a controller/processor 475 or a memory 476 in FIG. 4 of the present disclosure.

In one embodiment, a second processor 1502 comprises at least one of the controller/processor 475 and the memory 476 in FIG. 4 in the present disclosure.

In Embodiment 15, the second receiver 1501 receives Q0 second-type radio signal(s) in the Q second-type radio signals; herein, the Q second-type radio signals respectively comprise Q pieces of first-type information; whether each of the Q0 second-type radio signal(s) can be selected as a synchronization reference is related to its comprised first-type information; the Q pieces of first-type information are independently generated, Q being a positive integer greater than 1, Q0 being a positive integer no greater than the Q.

In Embodiment 15, the second receiver 1501 receives Q0 second-type radio signal(s) of Q second-type radio signals; herein, the Q second-type radio signals respectively comprise Q pieces of first-type information; whether each of the Q0 second-type radio signal(s) can be selected as a synchronization reference is related to its comprised first-type information; whether the Q pieces of first-type information are independently generated is related to whether the transmitter of the Q second-type radio signals is in coverage, Q being a positive integer greater than 1, Q0 being a positive integer no greater than the Q.

In one embodiment, each of the Q0 piece(s) of first-type information is related to Spatial Rx parameter(s) of one of P first-type radio signal(s), the P first-type radio signal(s) is(are) received by the transmitter of the Q second-type radio signals; and P is a positive integer.

In one embodiment, each of the Q0 second-type radio signal(s) comprises a second information, the second information indicating whether the transmitter of the Q second-type radio signals is in coverage.

In one embodiment, received quality of a received target-specific signal is used by the transmitter of the Q second-type radio signals for judging whether the transmitter is in coverage.

In one embodiment, when the transmitter of the Q second-type radio signals is in coverage, the Q pieces of first-type information are independently generated.

In one embodiment, when the transmitter of the Q second-type radio signals is out of coverage, the Q pieces of first-type information are not independently generated.

In one embodiment, the second node is a UE.

In one embodiment, the second node is a relay node.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
    judging whether the first node is in coverage; and
    transmitting Q second-type radio signals;
    wherein the Q second-type radio signals respectively comprise Q pieces of first-type information; whether each of the Q second-type radio signals can be selected as a synchronization reference is related to its comprised first-type information; the Q pieces of first-type information are independently generated, or, whether the Q pieces of first-type information are independently generated is related to whether the first node is in coverage; and Q is a positive integer greater than 1.

2. The method according to claim 1, comprising:
    receiving P first-type radio signal(s), P being a positive integer;
    wherein each of the Q pieces of first-type information is related to Spatial Rx parameter(s) of one of the P first-type radio signal(s).

3. The method according to claim 1, wherein each of the Q second-type radio signals comprises a second information, the second information being used for indicating whether the first node is in coverage.

4. The method according to claim 3, comprising:
    receiving a target-specific signal, and judging whether the first node is in coverage according to target received quality of the target-specific signal.

5. The method according to claim 4, wherein when the first node is in coverage, the Q pieces of first-type information are independently generated; and when the first node is out of coverage, the Q pieces of first-type information are not independently generated.

6. A method in a second node for wireless communications, comprising:
    receiving Q0 second-type radio signal(s) of Q second-type radio signals;
    wherein the Q second-type radio signals respectively comprise Q pieces of first-type information; whether each of the Q0 second-type radio signal(s) can be selected as a synchronization reference is related to its comprised first-type information; the Q pieces of first-type information are independently generated, or, whether the Q pieces of first-type information are independently generated is related to whether the transmitter of the Q second-type radio signals is in coverage; Q is a positive integer greater than 1, and Q0 is a positive integer no greater than the Q.

7. The method according to claim 6, wherein each of the Q0 piece(s) of first-type information is related to Spatial Rx parameter(s) of one of P first-type radio signal(s), the P first-type radio signal(s) is(are) received by the transmitter of the Q second-type radio signals; and P is a positive integer.

8. The method according to claim 6, wherein each of the Q0 second-type radio signal(s) comprises a second information, the second information indicating whether the transmitter of the Q second-type radio signals is in coverage.

9. The method according to claim 8, wherein received quality of a received target-specific signal is used by the transmitter of the Q second-type radio signals for judging whether the transmitter of the Q second-type radio signals is in coverage.

10. The method according to claim 9, wherein when the transmitter of the Q second-type radio signals is in coverage, the Q pieces of first-type information are independently generated; and when the transmitter of the Q second-type radio signals is out of coverage, the Q pieces of first-type information are not independently generated.

11. A first node for wireless communications, comprising:
    a first processor: judging whether the first node is in coverage; and
    a first transmitter: transmitting Q second-type radio signals;
    wherein the Q second-type radio signals respectively comprise Q pieces of first-type information; whether each of the Q second-type radio signals can be selected as a synchronization reference is related to its comprised first-type information; the Q pieces of first-type information are independently generated, or, whether the Q pieces of first-type information are independently generated is related to whether the first node is in coverage; and Q is a positive integer greater than 1.

12. The first node according to claim 11, wherein each of the Q second-type radio signals comprises a second information, the second information being used for indicating whether the first node is in coverage.

13. The first node according to claim 12, comprising:
    a first receiver: receiving P first-type radio signal(s), P being a positive integer;
    wherein each of the Q pieces of first-type information is related to Spatial Rx parameter(s) of one of the P first-type radio signal(s).

14. The first node according to claim 12, comprising:
    the first receiver: receiving a target-specific signal, and judging whether the first node is in coverage according to target received quality of the target-specific signal.

15. The first node according to claim 14, wherein when the first node is in coverage, the Q pieces of first-type information are independently generated; and when the first node is out of coverage, the Q pieces of first-type information are not independently generated.

16. A second node for wireless communications, comprising:
    a second receiver: receiving Q0 second-type radio signal(s) of Q second-type radio signals;
    wherein the Q second-type radio signals respectively comprise Q pieces of first-type information; whether each of the Q0 second-type radio signal(s) can be selected as a synchronization reference is related to its comprised first-type information; the Q pieces of first-type information are independently generated, or, whether the Q pieces of first-type information are independently generated is related to whether the transmitter of the Q second-type radio signals is in coverage; Q is a positive integer greater than 1, and Q0 is a positive integer no greater than the Q.

17. The second node according to claim 16, wherein each of the Q0 piece(s) of first-type information is related to Spatial Rx parameter(s) of one of P first-type radio signal(s), the P first-type radio signal(s) is(are) received by the transmitter of the Q second-type radio signals; and P is a positive integer.

18. The second node according to claim 16, wherein each of the Q0 second-type radio signal(s) comprises a second information, the second information indicating whether the transmitter of the Q second-type radio signals is in coverage.

19. The second node according to claim 18, comprising:
the second receiver: received quality of a received target-specific signal being used by the transmitter of the Q second-type radio signals for judging whether the transmitter of the Q second-type radio signals is in coverage.

20. The second node according to claim 19, wherein when the transmitter of the Q second-type radio signals is in coverage, the Q pieces of first-type information are independently generated; and when the transmitter of the Q second-type radio signals is out of coverage, the Q pieces of first-type information are not independently generated.

* * * * *